(12) United States Patent
Lester et al.

(10) Patent No.: US 12,143,060 B2
(45) Date of Patent: Nov. 12, 2024

(54) ELECTRICAL BONDING SPLICE FOR SOLAR PANEL RAIL GUIDES

(71) Applicant: IronRidge, Inc., Hayward, CA (US)

(72) Inventors: Bryan Lester, Phoenix, AZ (US); Roger Pedlar, Phoenix, AZ (US); Jon Ash, Phoenix, AZ (US); Joseph P. Sirochman, Prescott, AZ (US); Joe Greer, Phoenix, AZ (US)

(73) Assignee: IronRidge, Inc., Hayward, CA (US)

( * ) Notice: Subject to any disclaimer, the term of this patent is extended or adjusted under 35 U.S.C. 154(b) by 204 days.

(21) Appl. No.: 17/784,248

(22) PCT Filed: Dec. 11, 2020

(86) PCT No.: PCT/US2020/064558
§ 371 (c)(1),
(2) Date: Jun. 10, 2022

(87) PCT Pub. No.: WO2021/119458
PCT Pub. Date: Jun. 17, 2021

(65) Prior Publication Data
US 2023/0043600 A1    Feb. 9, 2023

Related U.S. Application Data

(60) Provisional application No. 62/946,891, filed on Dec. 11, 2019.

(51) Int. Cl.
*H02S 30/00* (2014.01)
*H01R 4/48* (2006.01)
*H01R 4/64* (2006.01)

(52) U.S. Cl.
CPC ............... *H02S 30/00* (2013.01); *H01R 4/48* (2013.01); *H01R 4/64* (2013.01)

(58) Field of Classification Search
CPC ......... Y02B 10/10; Y02E 10/47; Y02E 10/50; H02S 30/00; H01R 4/48; H01R 4/64; H01R 4/4809; H01R 2101/00; F24S 25/65; F24S 25/30
See application file for complete search history.

(56) References Cited

U.S. PATENT DOCUMENTS

| | | |
|---|---|---|
| 2010/0269447 A1 | 10/2010 | Schuit et al. |
| 2011/0203637 A1 | 8/2011 | Patton et al. |
| 2013/0109249 A1 | 5/2013 | Roth |

(Continued)

OTHER PUBLICATIONS

Ironridge, "Boss® Bonded Structural Splice", website, printed Oct. 5, 2022, pp. 1-7.

*Primary Examiner* — Mark R Wendell
(74) *Attorney, Agent, or Firm* — The Webb Law Firm

(57) ABSTRACT

In various representative aspects, an assembly for connecting and electrically bonding two solar panel rail guides. More specifically, the assembly provides a splice that slides within two solar panel rail guides and includes an elongated spring element that is inserted into an elongated slot in the splice and enables the two solar panel rail guides to be electrically bonded together when various bonding techniques are used to allow portions of the spring to penetrate the oxidation layers of the inner surfaces of the rail guides as they are joined together. Another embodiment that utilizes a bonding element that is inserted into an elongated slot of a splice and also enables two solar panel rail guides to be electrically bonded when the rail guides are joined.

13 Claims, 37 Drawing Sheets

(56) References Cited

U.S. PATENT DOCUMENTS

2014/0026946 A1  1/2014  West et al.
2014/0260068 A1  9/2014  Pendley et al.
2016/0285177 A1  9/2016  Meine et al.
2017/0063301 A1  3/2017  Ash

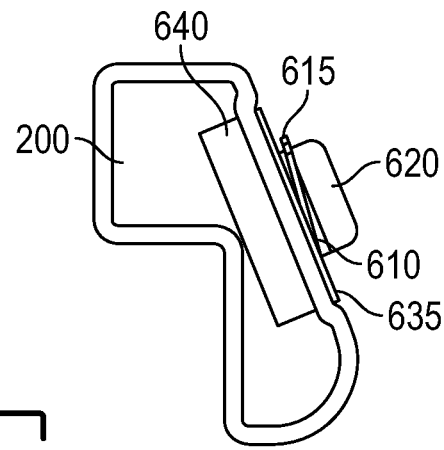
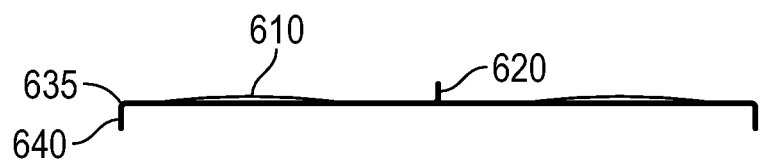
FIG. 21A
FIG. 21B
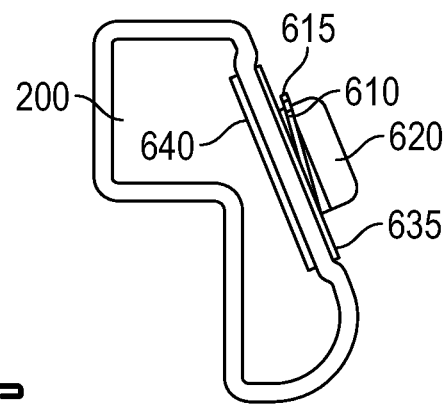
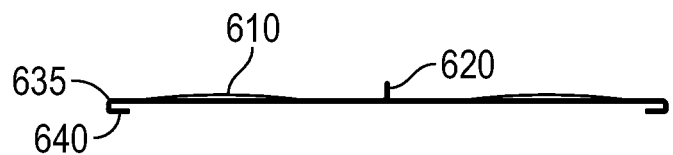
FIG. 22A
FIG. 22B

ELECTRICAL BONDING SPLICE FOR SOLAR PANEL RAIL GUIDES

CROSS-REFERENCE TO RELATED APPLICATIONS

This application is the United States national phase of International Application No. PCT/US2020/064558 filed Dec. 11, 2020, and claims priority to U.S. Provisional Patent Application No. 62/946,891 filed Dec. 11, 2019, the disclosures of which are hereby incorporated by reference in their entirety.

BACKGROUND OF INVENTION

Field of the Invention

The present invention relates generally to an apparatus for connecting and electrically bonding two solar panel rail guides. More specifically, the apparatus provides a novel and improved splice assembly that includes an inner splice that joins two solar panel rail guides by sliding the inner splice within the inner contour of two solar panel rail guides, and utilizing an elongated spring element that is embedded within a slot along the length of the splice. The spring both bonds and provides tactile and visual feedback for proper alignment of the splice within the rails that it joins. The spring element includes sharp metal raised portions on its outer surface that penetrate the outer layer, which can be comprised of an oxidation layer, a surface treatment layer or any similar coating that covers the conducting metal material as the two metal rails are joined. By doing so, the splice provides a conducting path to electrically bond the two rails.

Alternate exemplary embodiments provide variations of novel and improved splice assembly that includes an inner splice that joins two solar panel rail guides by sliding within the inner contour of two solar panel rail guides and utilizing bonding features to electrically bond the splice and the two solar panel rail guides.

DESCRIPTION OF THE RELATED ART

Any discussion of the prior art in the specification should in no way be considered as an admission that the prior art is widely known or forms part of common general knowledge in the field.

The installation of solar panel arrays on residential roofs can be arduous and time-consuming. Depending on the array design, the components required to install the array can make the installation process even more difficult. This is particularly true when the components must be installed on a roof that links to a rail guide structure for supporting the solar panel array. Within this type of structure, it is desirable to provide electrical connectivity between each rail guide.

Solar panel arrays typically extend for several feet across a roof. In many cases, several rail guides must be joined to support the array. Internal bonding splices are often used to couple the rail guides together. And when the rail guides are coupled, they must be electrically connected as well.

As shown in FIG. 1, a typical rail guide 100 is a metallic structure with an oxidation layer that covers its surface. It also normally includes openings or hollows inside and extends for a given length. In order to join two rail guides, a connecting splice is often used. A connecting splice 104 is also typically made of an electrical material that is coated with oxidation layer over its entire surface. The connecting splice 104 generally conforms to the shape of the inner-hollow shape of the rail guide 100. The splice 104 is inserted into the hollow portions of each respective rail guide 100 and joined together at a given point along the splice. The two rail guides are then electrically connected to each other by using some of the techniques described below.

The preferred embodiment of the invention is an improvement over existing apparatuses and installation methods of solar panel rail guides that use splices to couple the rail guides. The existing apparatuses typically use one of three designs. The first design, as shown in FIG. 1, includes the use of a grounding strap 103 and 102 that secures and electrically bonds two rail guides that are spliced together using an internal rail splice that fits within the two rail guides. The grounding strap 103 is secured to one of the rail guides 100 and is then screwed to the second rail guide 106 once it is brought together at the splice point 105 as shown in FIG. 1. This design requires the use of separate components—in particular, the grounding strap 103 itself and two separate screws 101.

The second type of design also requires the use of a metallic grounding strap 112 secured by screws 111. But in this design, the grounding strap 112 is not used with an internal splicing rail and acts simply to provide the electrical grounding path between the two solar panel rail guides 110 as shown in FIGS. 2 and 3. The grounding strap 112 does not provide a secure connection for coupling the rail guides 110 at a particular point like the first design above does.

A third design includes a single splice piece 120 capable of fitting within the inner contour of a corresponding solar panel rail guide in a telescoping fashion. Both parts are typically made of metal or of some conducting material surrounded by a non-conductive surface treatment layer. As shown in FIG. 4, a stop pin 122 and a pair of bonding pins 121 are inserted into a prefabricated opening on the side of the splice as shown. Both parts are also typically made from a conducting material.

The bonding pins 121 each have a raised portion on the head of the pin as shown in FIG. 5. The raised portion is typically aligned in the horizontal direction with respect to the length of the splice. A stop pin 122 is also shown below. The stop pin 112 also has a raised portion that is typically a flat protrusion and is oriented in the vertical direction with respect to the length of the splice. The splice 120 is used by inserting the bonding pins 121 and the stop pin 122 by pressing them into place as shown in FIG. 6. One end of the splice 120 is then inserted into the solar panel rail guide 125/125A all the way until it reaches the stop pin 122 as shown in FIG. 7. As the splice 120 is pushed toward the stop pin 122, the raised portion of the bonding pin 121 penetrates the inner surface 130 of the solar panel rail guide 125/125A. By doing so, it creates an electrical bonding path between the solar panel rail guide 125 and the splice 120 as shown in FIG. 8. Then the opposite end of the splice 120 is inserted into the second solar panel rail guide 125 completely until it reaches the stop pin 122 as shown in FIG. 9. The raised portion of the first bonding pin 121 then contacts the metallic portions of the rail guides 125. The second bonding pin 121 penetrates the same surface layer of the solar panel rail guide 125 and creates a completed electrical path between the two rail guides 125 as they are fully coupled together and separated only by the width of the vertical protrusion of the stop pin 122. A limitation to this design is that the bonding pins 121 and the stop pins 122 must be installed separately before inserting the splice 120 between the two guides 125.

Other existing solutions are also inadequate at addressing these concerns. For example, U.S. 2011/0203637 issued to Patton et al, discloses an assembly for joining two solar panel rail guides using a splice, but provides no means to maintain the splice in the desired center location while providing a means to bond the two rail guides with the splice. US 2014/0026946 issued to West et al discloses a splice for joining two solar panel rail guides but offers no tactile feedback to center the splice where the rail guides are coupled together, nor does it offer any means to secure or electrically bond the rail guides to the splice. US 2014/0260068 issued to Pendley et al also discloses a splice used to connect to guides, but it provides no tactile feedback to center the splice, nor does it offer any means to electrically bond the rail guides to the splice or each other.

The following improvement on this design eliminates the need for using separate bonding and stop pins during assembly of the rails and it reduces the amount of time required to install the rails as well. The present invention includes several embodiments of a splice element that are similar to the one shown in the third embodiment described above.

SUMMARY OF THE INVENTION

The invention is summarized below only for purposes of introducing embodiments of the invention. The ultimate scope of the invention is to be limited only to the claims that follow the specification.

It is an object of this invention to provide an assembly for joining and electrically connecting two solar panel rail guides.

It is a further object of this invention that the assembly join the rail guides using an internal splice.

It is a further object of this invention that the assembly includes a spring element for electrically bonding the two rail guides when they are joined along the splice.

It is a further object of this invention that the spring provide a tactile feedback element as a flange that extends outward from a central portion of the spring.

It is a further object of this invention that alternatively, the spring element includes a pair of raised resilient bands coupled to the central portion of the spring.

It is a further object of this invention that each of the raised resilient bands include an electrical bonding element that is sharp and extends upward from the resilient bands that is capable of penetrating an oxidation or surface treatment layer or coating of the inner surface of the each of the rail guides.

It is a further object of this invention that the ends of the resilient bands and the edges of the central portion are wider than the resilient bands.

It is a further object of this invention that the electrical bonding elements are positioned at plateau portions of the resilient bands.

It is a further object of this invention that the edges of the central portion of the spring include notches.

It is a further object of this invention that the resilient bands include a position indicator positioned between the electrical bonding element and the central portion of the spring.

It is a further object of this invention that the splice includes a shell with an outer and inner surface.

It is a further object of this invention that the splice includes a pair of opposing lips that form a channel along the length of the shell.

It is a further object of this invention that the opposing lips form a groove along the length of the opposing lips.

It is a further object of this invention that the edges of the central portion and the ends of the resilient bands are configured to fit and slidably engage within the grooves of the channel of the splice.

It is a further object of this invention that the bonding elements provide sufficient friction to restrict the rail guides from laterally moving once joined together at the tactile feedback location along the spring.

A person with ordinary skill in the relevant art would know that any shape or size of the elements described below may be adopted. Any combinations of suitable number, shape, and size of the elements described below may be used. Also, any materials suitable to achieve the object of the current invention may be chosen as well.

BRIEF DESCRIPTION OF THE DRAWINGS

A more complete understanding of the present invention may be derived by referring to the detailed description and claims when considered in connection with the following illustrative figures. In the following figures, like reference numbers refer to similar elements and steps throughout the figures.

FIG. 21A illustrates a side view of the spring device of FIG. 19 in the open position.

FIG. 21B illustrates an end view of the splice and spring of FIG. 19 in the open position.

FIG. 22A illustrates a side view of the spring device of FIG. 19 in the locked position.

FIG. 22B illustrates an end view of the splice and spring of FIG. 19 in the locked position.

DETAILED DESCRIPTION OF THE INVENTION

In the following description, and for the purposes of explanation, numerous specific details are provided to thoroughly understand the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed embodiments may be applied. The full scope of the invention is not limited to the example(s) that are described below.

Figure 1:
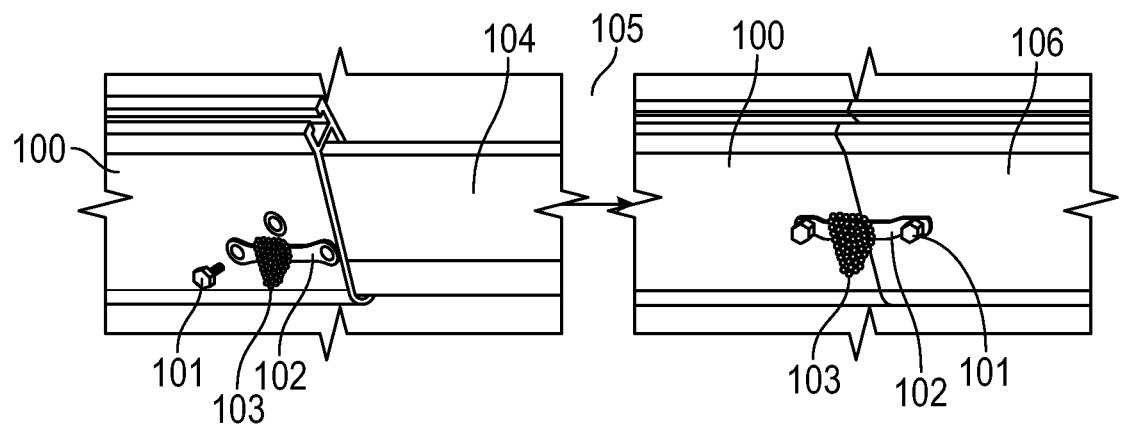
FIG. 1 illustrates a front perspective view of a prior art solar panel rail guide splice that utilizes a grounding strap.
Figure 2:
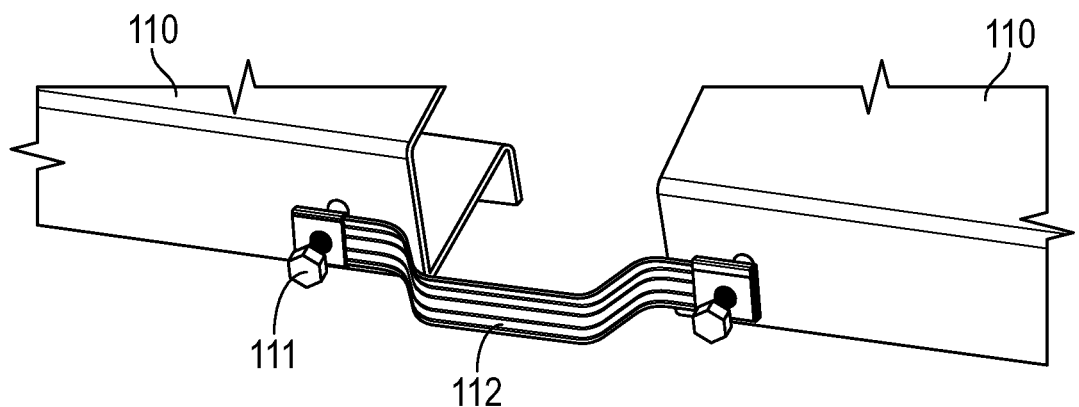
FIG. 2 illustrates a front perspective view of an alternate embodiment of a prior art solar panel rail guide splice that utilizes a grounding strap.
Figure 3:
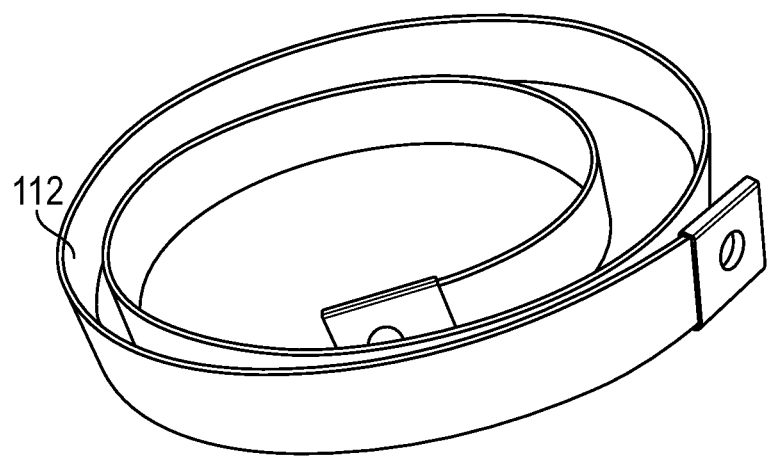
FIG. 3 illustrates a perspective view of a prior art grounding strap used with the embodiment shown in FIG. 2.
Figure 4:
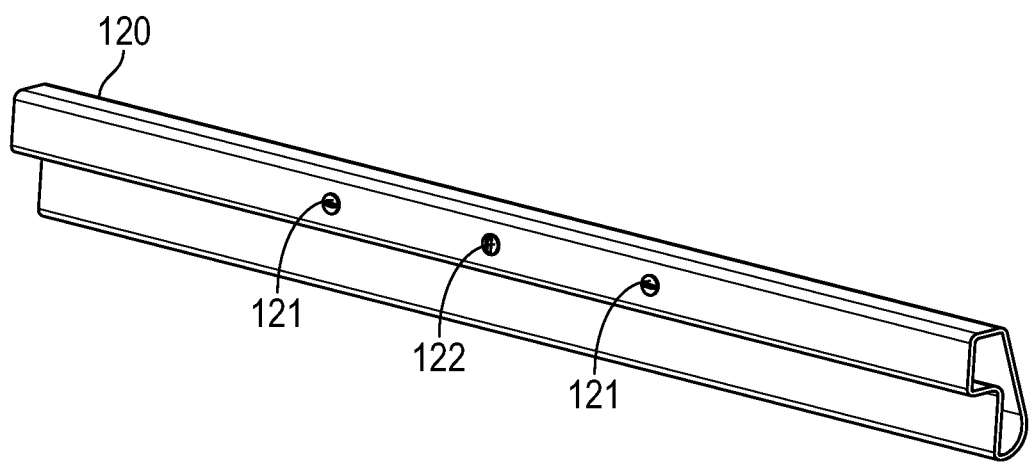
FIG. 4 illustrates a perspective view of an alternate embodiment of a prior art solar panel splice that utilizes bonding pins.
Figure 5:
FIG. 5 illustrates perspective views of prior art bonding pins used with the solar panel splice of FIG. 4.
Figure 6:
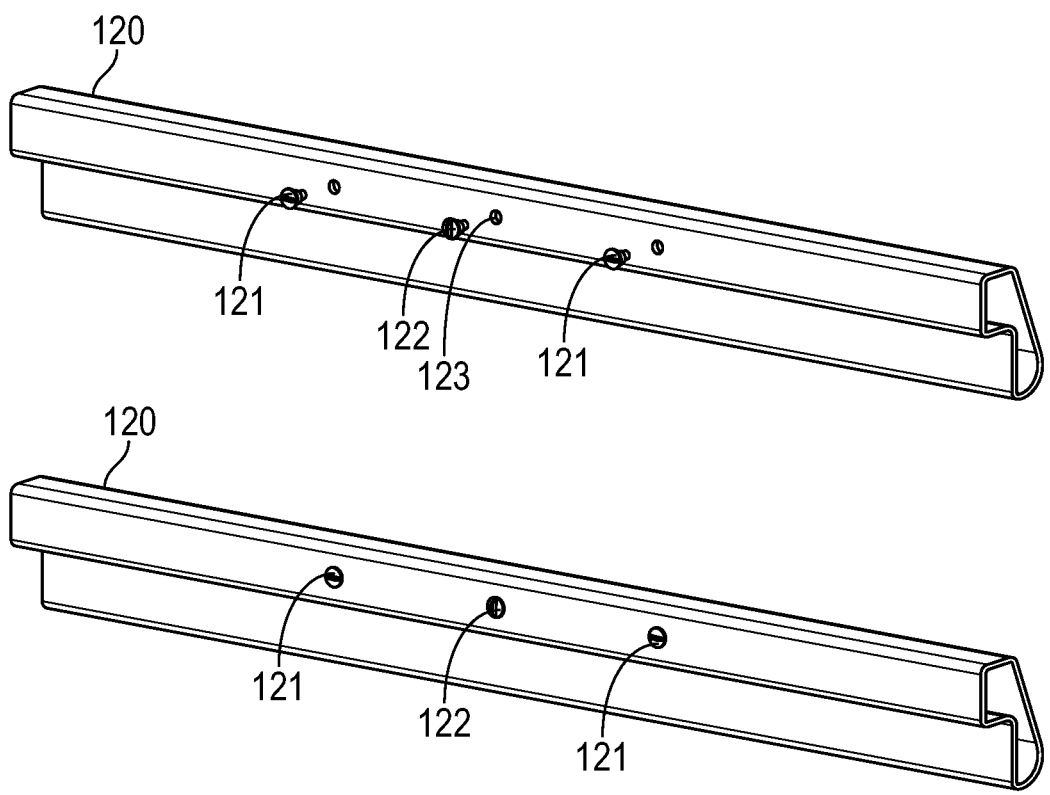
FIG. 6 illustrates a perspective view of the solar panel splice of FIG. 4 showing the bonding pins of FIG. 5 prior to, and after being assembled in the splice.
Figure 7:
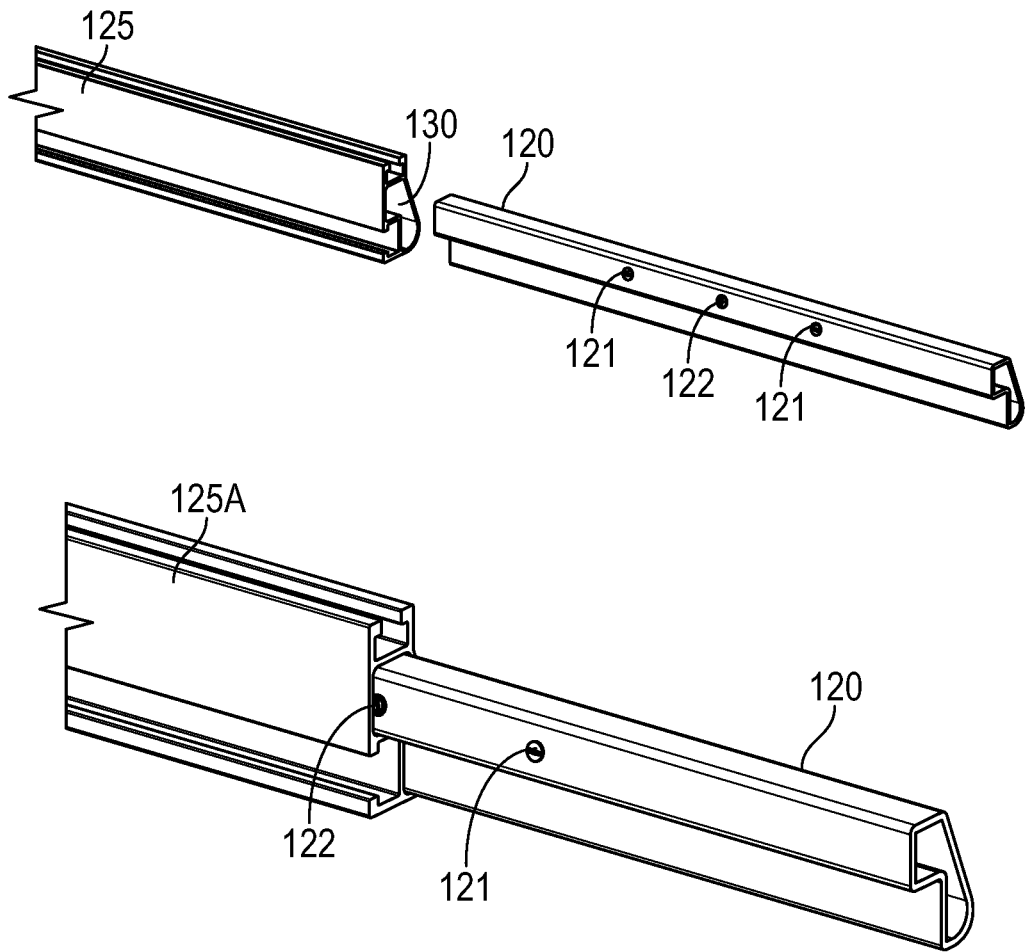
FIG. 7 illustrates a perspective view of a prior art solar panel rail guide utilizing the solar panel splice of FIG. 4 before and after insertion into the rail guide.
Figure 8:
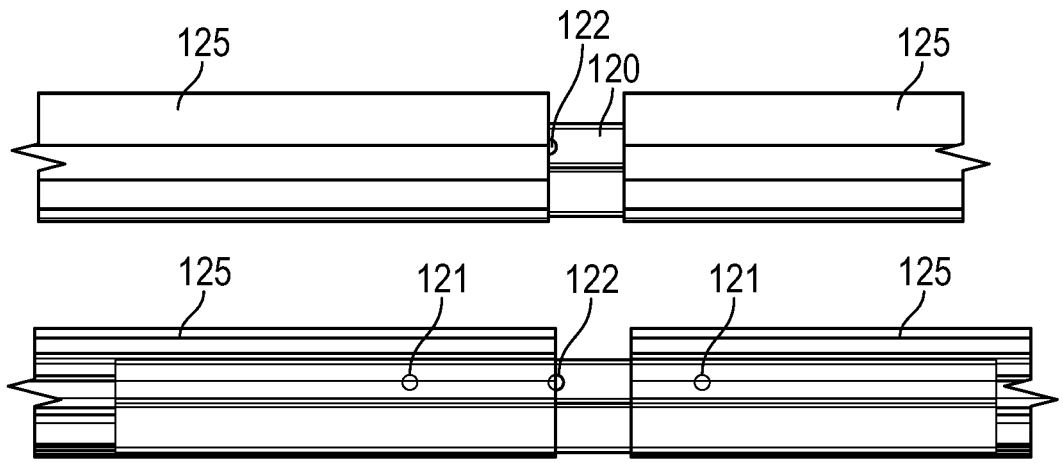
FIG. 8 illustrates a front view of both a solid and transparent view of the prior art solar panel rail guides with the solar panel splice of FIG. 7 present inside the rail guide.
Figure 9:
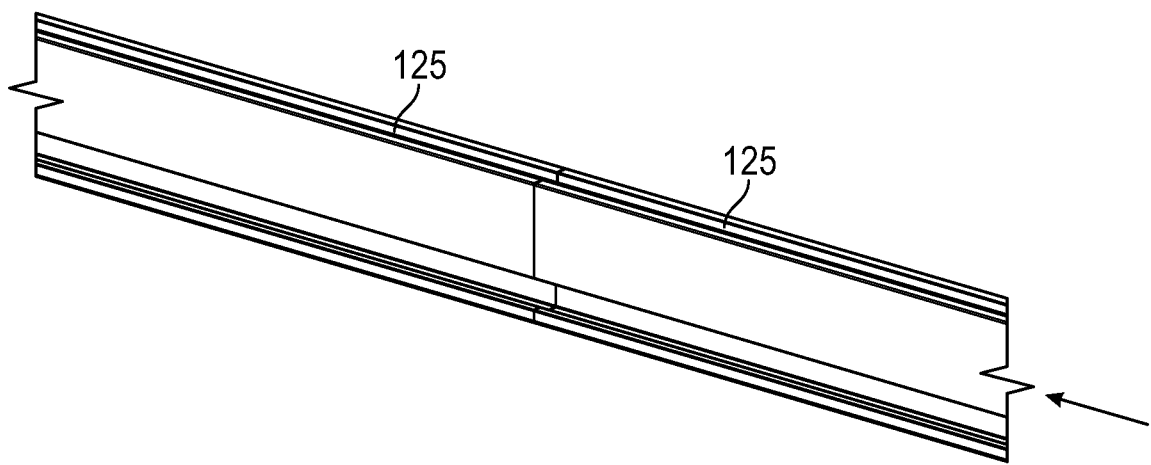
FIG. 9 illustrates a perspective view of the pair of prior art solar panel rail guides joined together with the splice inside the rail guides.
Figure 10:
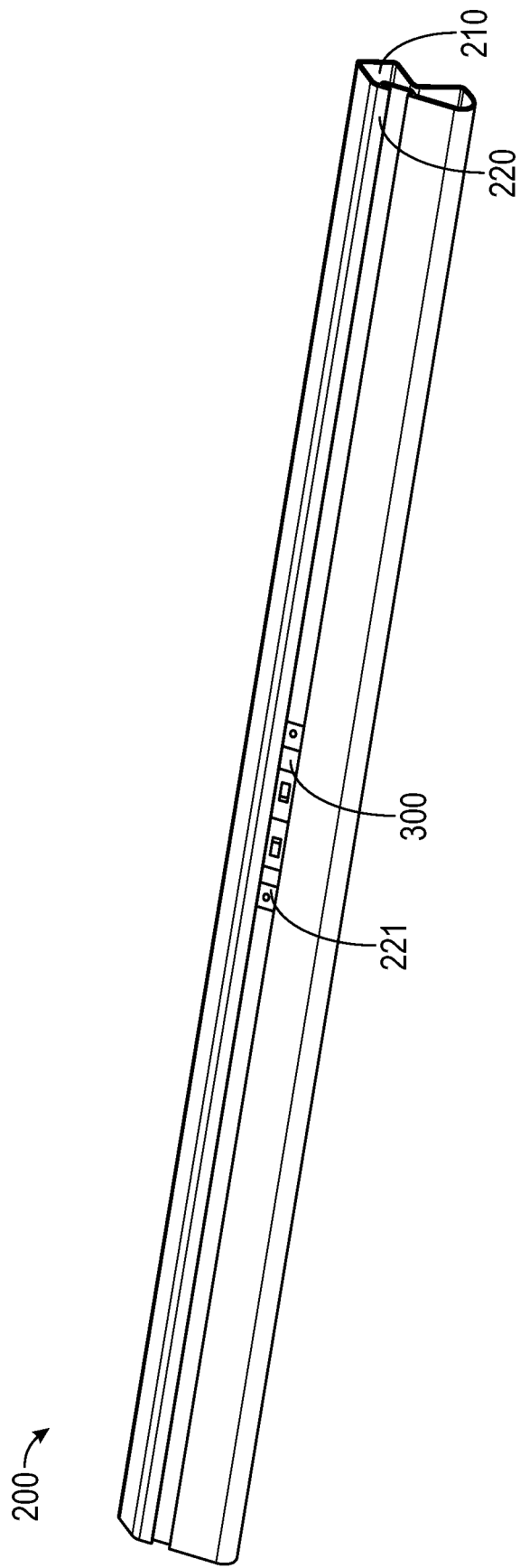
FIG. 10 illustrates a perspective view of an exemplary splice with an exemplary splice present in a recessed channel along the splice's length.
Figure 61A:
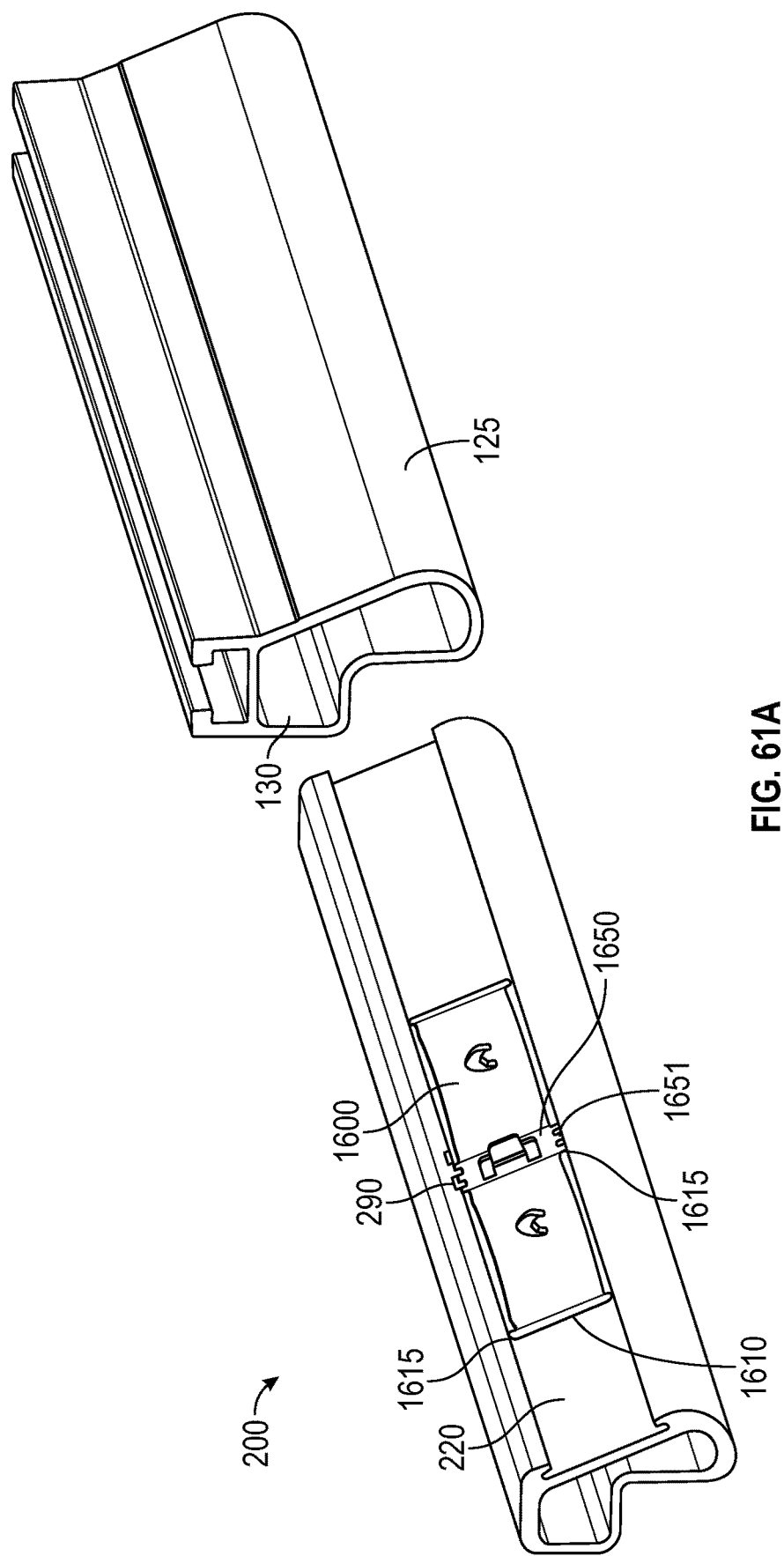
FIG. 61A illustrates a perspective view of the assembled spring and splice assembly of FIG. 60 prior to insertion into the rail guide of FIG. 7.
Figure 61B:
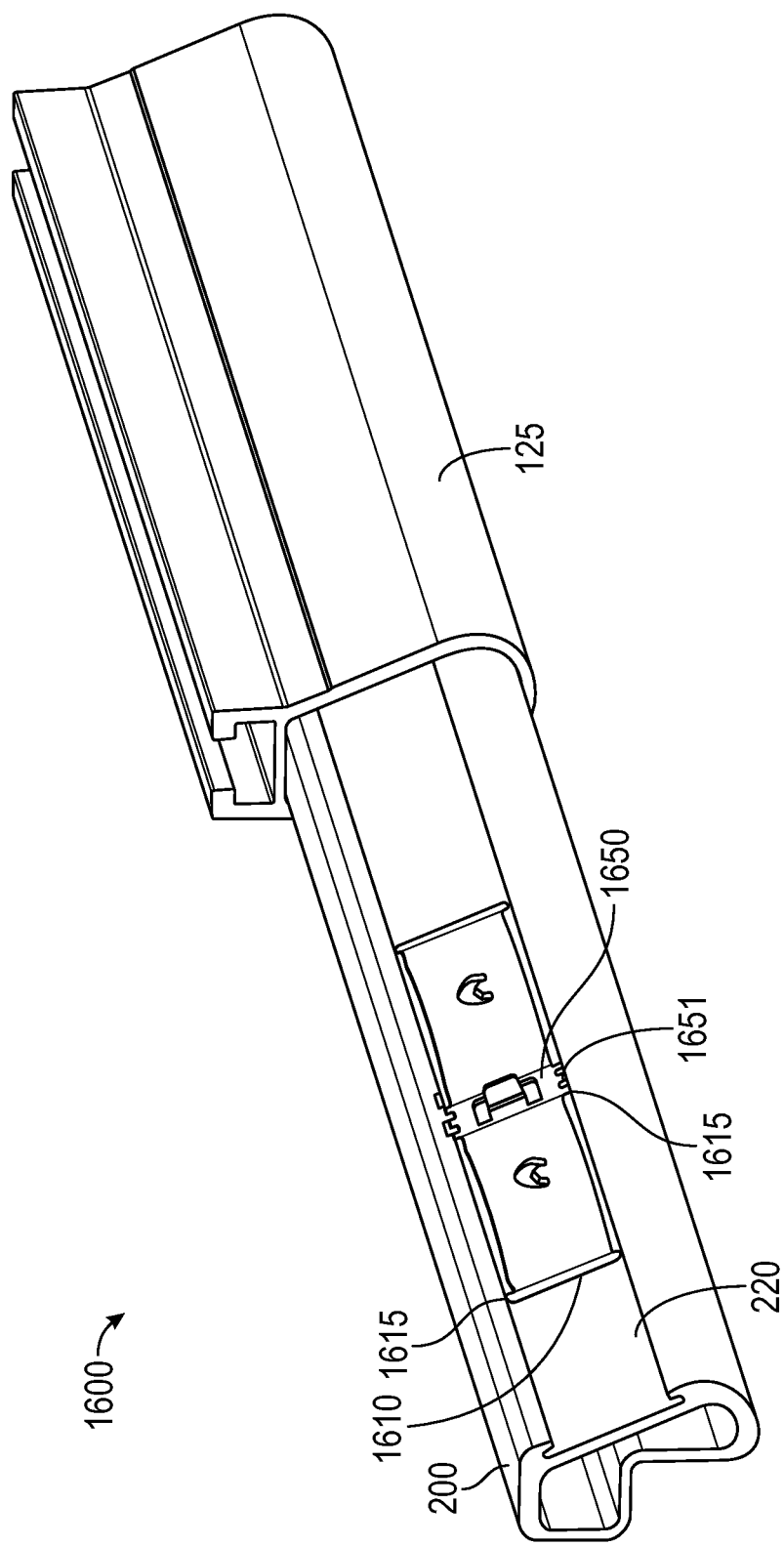
FIG. 61B illustrates a perspective view of the assembly and rail guide of FIG. 61A with the splice partially inserted into the rail guide.

The present invention utilizes several embodiments of a splice element 200 as shown in FIG. 10. The splice 200 shown, is typically hollow on the inside 210 and is shaped to fit the contour of the inner portion of two rail guides 126 to be connected as shown in FIGS. 61A and 61B. The front-facing side includes an embedded slot 220 that extends across the full length of the splice 200 and a spring element 300. Although the embedded slot 220 extends across the full length of the splice 200, the embedded slot 220 need only extend the length of the spring element 300. The embedded slot 220 includes grooves 221 which are recessed into the wall of the splice 200 at the edges of the slot 220.

Figure 11:
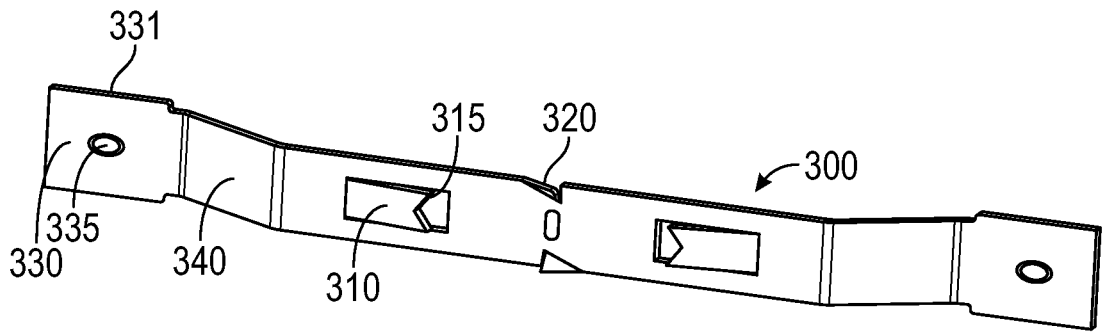
FIG. 11 illustrates an iso view of an exemplary spring device with bonding features and a tactile feedback element.
Figure 12:
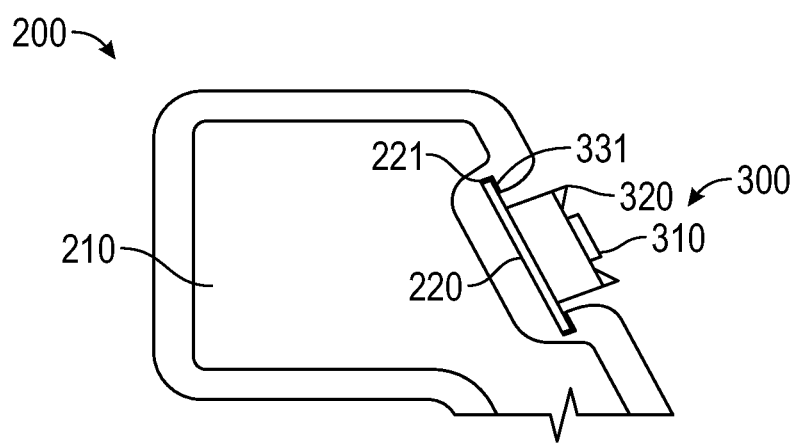
FIG. 12 illustrates an end view of the splice of FIG. 10 with the spring device of FIG. 11 in the channel.

The spring element 300 is shown in FIG. 11 and is typically inserted into the embedded slot 220 on one side of the splice 200. A side view of the spring element 300 is shown in FIG. 12 below that demonstrates how the spring 300 fits within the embedded slot 220 in the splice 200. The spring element 300 includes two ends 330. Each end 330 includes tabs 331 extending from opposite sides of the ends 330. The tabs 331 extend into the grooves 221 of the slot 220. This enables the spring element 300 to slide along the embedded slot 220. Dimples 335 pressed into the ends 330 which extend towards the recessed surface of the slot 220, which can provide a resistance fit which would prevent the spring 330 from sliding along the slot 220. Optionally the dimples 335 can be pressed into the spring ends 330 when the spring 300 is installed on the splice 200 with the tabs 331 are within the grooves 221 such that the pressing of the dimples 335 causes deformation of the top surface of the slot 220. Between the two ends 330, a raised resilient band 340 extends outward. The resilient band 340 includes at least two resilient protrusions 310 with sharp ends 315 capable of penetrating the oxidation layers of the inside 130 of the rail guides 125 and forming an electrical bond between the two rails 125 when they are joined by the splice 200. A pair of raised portions 320 in the center of the resilient band 340 provide stopping points that serve as tactile feedback to the installer when the rail guides 125 are joined at the center for proper alignment of the splice 200.

Figure 13:
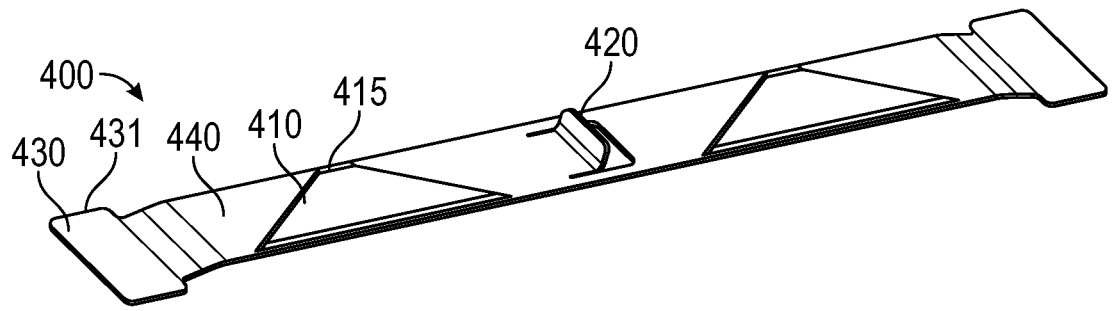
FIG. 13 illustrates an iso view of an alternate exemplary embodiment of a spring with bonding features and a tactile feedback element.
Figure 14:
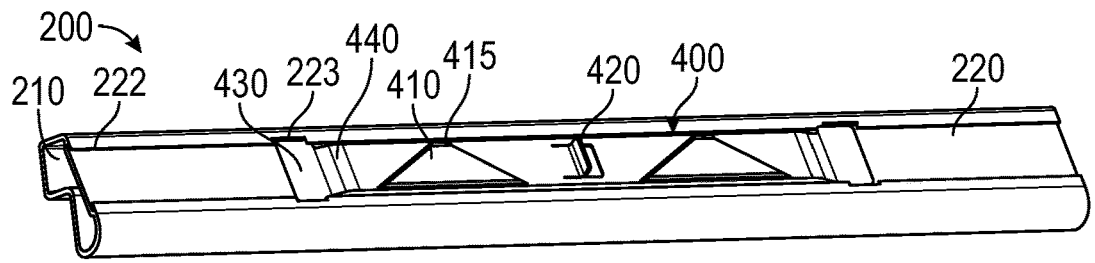
FIG. 14 illustrates a perspective view of the splice of FIG. 10 with the spring device of FIG. 13 in the channel.
Figure 15:
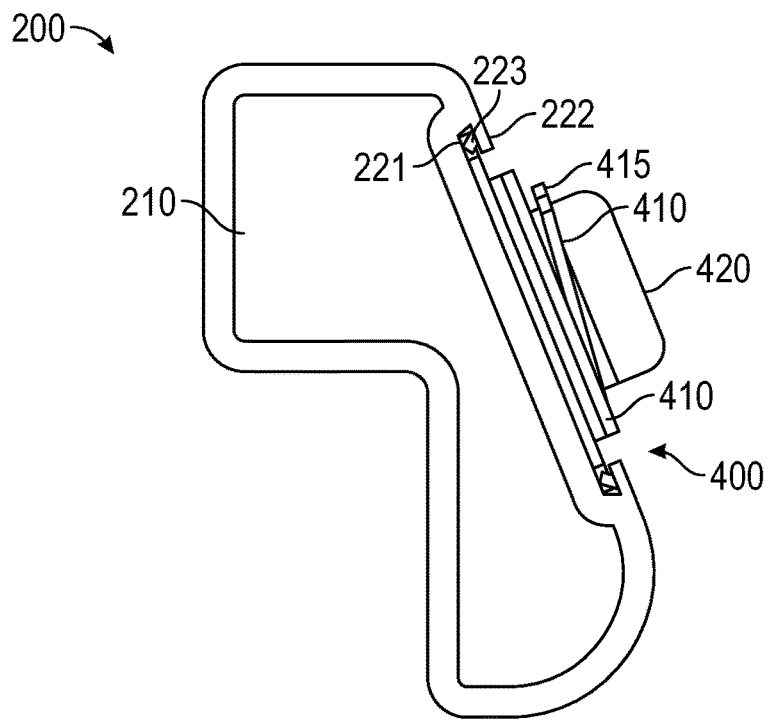
FIG. 15 illustrates an end view of FIG. 14.

An alternate exemplary embodiment of the apparatus 300 is shown as spring 400 in FIG. 13. The spring 400 also includes a structure similar to that of the spring 300 shown in FIG. 11. The spring includes two ends 430. Each end 430 includes tabs 431 extending from opposite sides of the ends 430. The tabs 331 extend into the grooves 221 of the slot 220. In this embodiment the sliding of the spring 400 along the splice 200 within the slot 220 is restrained by deformed portions 223 of the lips 222 of the grooves 221. The lips 222 are pressed down onto the tabs 431 creating the restraining deformed portions 223 which can be directly on or partially surround the tabs 431. A raised resilient band 440 extends from the two ends 430, which includes bonding elements 410. Each bonding element 410 is generally trapezoidal and is present on opposite sides of the resilient band 440. Each bonding element 410 is raised outward and includes a resilient protrusion with a sharp end 415 capable of penetrating the oxidation layers of the inside 130 of the rail guides 125 and forming an electrical bond between the two rails 125 when they are joined at the center of the splice 200. A single vertical extension 420 is positioned at the center of the resilient band 440. The extension 420 provides tactile feedback to the installer when the rail guides 125 are joined at the center of the splice 200 for proper alignment. The extension 420 similar to the raised portions 320 and similar features in other embodiments also acts as a stop to prevent the splice 200 from sliding further into the rail 125. FIG. 14 shows the spring 400 installed in the channel 220 of the splice assembly 200 and the deformed portions on the lips 222 engaging the tabs 431 of the spring 400. FIG. 15 shows an end view of the assembled splice 200 in FIG. 14.

Figure 16:
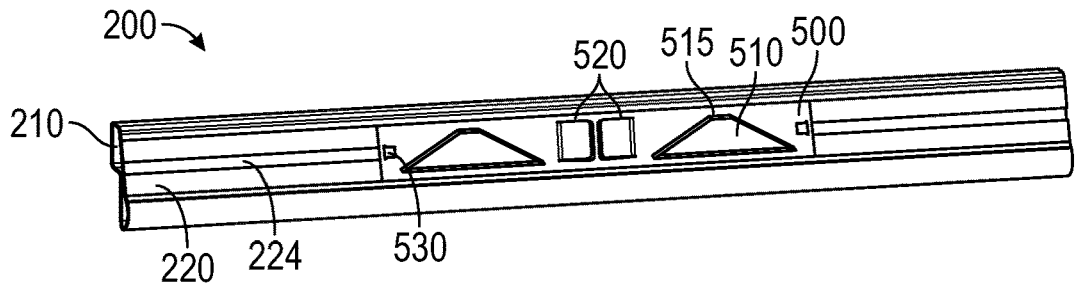
FIG. 16 illustrates a perspective view of the splice of FIG. 10 with an alternate exemplary embodiment of a spring device in the channel with bonding features and a tactile feedback element.
Figure 17:
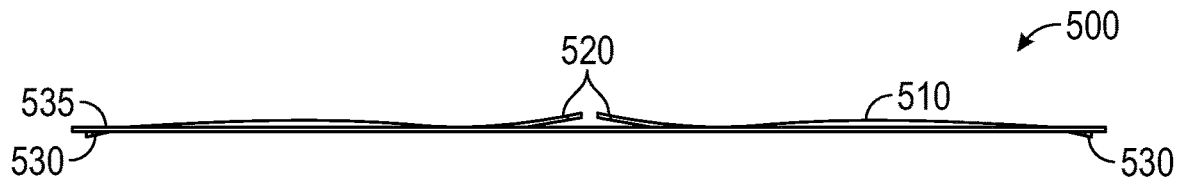
FIG. 17 illustrates a side view of the spring device shown in FIG. 16.
Figure 18:
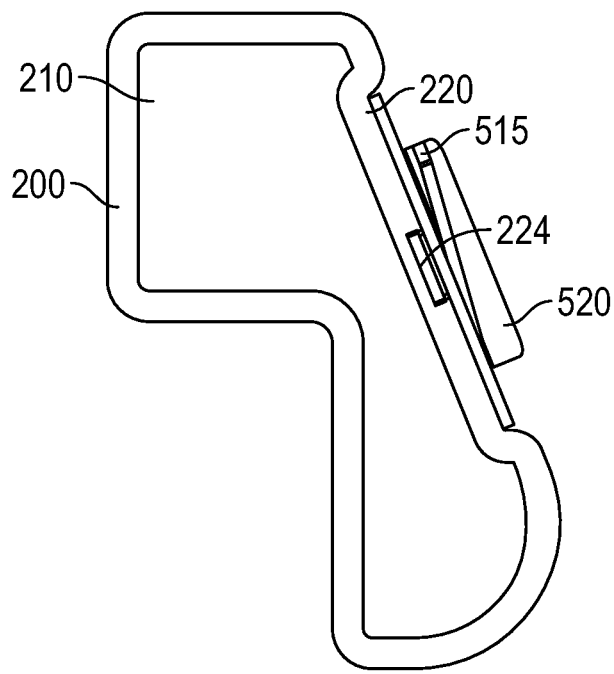
FIG. 18 illustrates an end view of the assembled splice of FIG. 10 with the spring device of FIG. 17.

In another exemplary embodiment of a spring, the spring 500 is shown in the completed assembly of FIG. 16. Spring 500 includes ends 535, a resilient middle band that includes generally trapezoidal bonding elements 510 with sharp ends 515. The spring 500 includes two modifications to the spring shown in FIG. 13. First, as shown in FIG. 17, the ends 535 of spring 500 include first tabs 530 that extend below the surface of the ends 535 of the spring 500. Channel 220 includes recessed channel 224. The first tabs 530 extend into recessed channel 224 and provide resistance to the spring 500 when moving along the splice 200. Once the spring 500 is in the desired position along the channel 220, the first tabs 530 are pressed into the surface of the recessed channel 224 thereby securing the spring 500 to splice 200. Second, a pair of opposing second tabs 520 extending outward at the center with the right tab 520 providing tactile feedback for a rail guide 125 approaching from the left side of the splice 200, and the left tab 520 providing tactile feedback for a rail guide 125 approaching from the right side of the splice 200. An end view of the assembled splice 200 with the spring 500 is shown below in FIG. 18.

Figure 19:
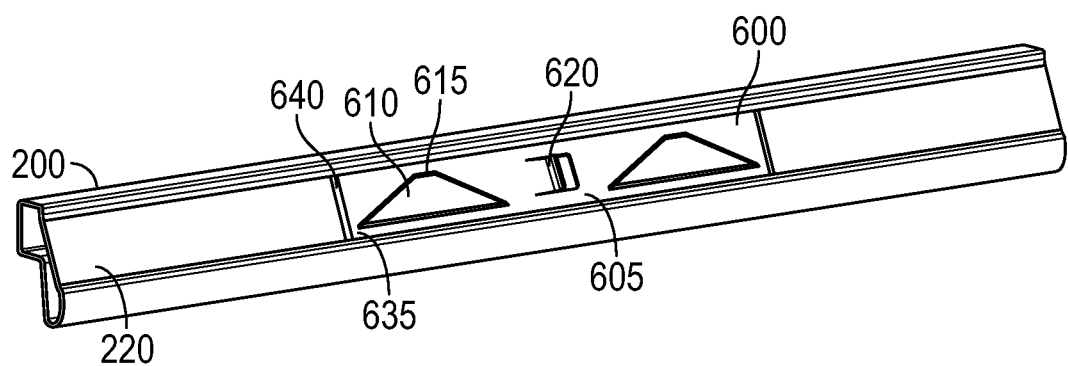
FIG. 19 illustrates a perspective view of the splice of FIG. 10 with an alternate exemplary embodiment of the spring device of FIG. 17 in the channel.

In another exemplary embodiment of a spring, the spring 600 is shown in the completed assembly of FIG. 19. Spring 600 includes ends 635, a middle band 605 that includes generally trapezoidal bonding elements 610 with sharp ends 615. Spring 600 includes two modifications to the spring 500 shown in FIG. 17. First, the splice 200 includes two vertical slit openings 250 in the channel 220 that align with the ends 635 of the spring element as shown below in FIG. 20.

Second, the spring 600 includes a single central vertical extension 620 and the trapezoidal bonding elements 610 used in the spring of FIG. 14. But as shown below in FIGS. 21A, 21B, 22A and 22B, the spring 600 includes two downward extending flanges 640 that extend through the slits 250 as shown in FIGS. 21A and 21B and are then bent to secure the spring 600 inside the channel 220 as shown in FIGS. 22A and 22B.

Figure 23:
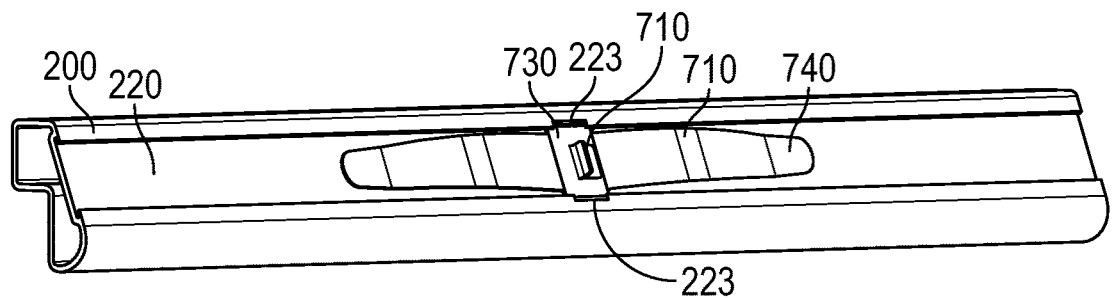
FIG. 23 illustrates a perspective view of the splice of FIG. 10 with an alternate exemplary embodiment of a spring in the channel.
Figure 24A:
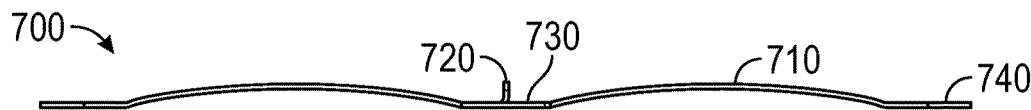
FIG. 24A illustrates a side view of the spring shown in FIG. 23.
Figure 24B:
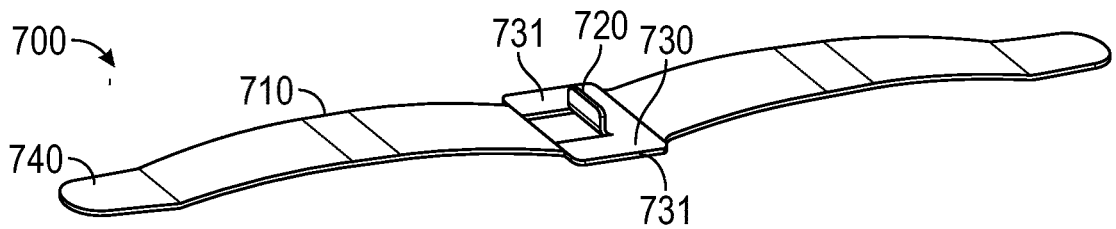
FIG. 24B illustrates a perspective view of the spring shown in FIG. 23.
Figure 25:
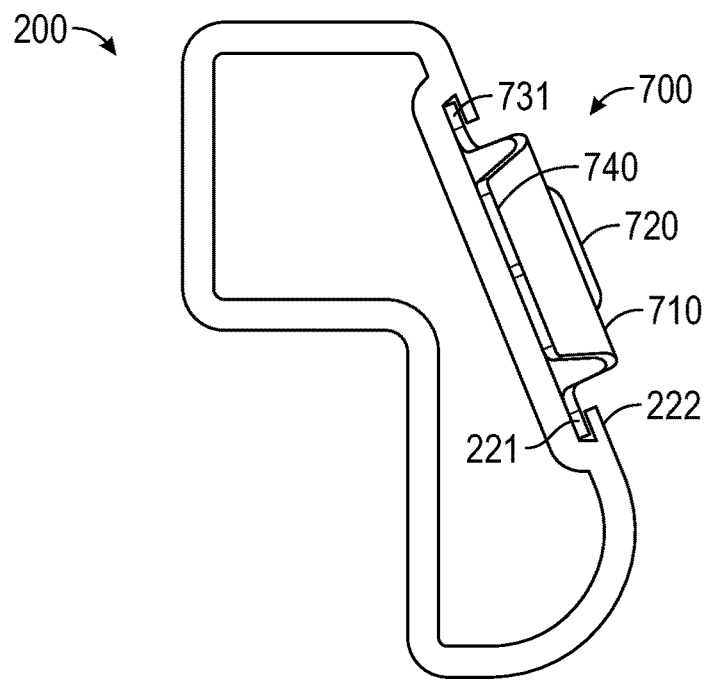
FIG. 25 illustrates an end view of the splice and spring of FIG. 23.

In another exemplary embodiment of a spring, the splice 200 of FIG. 10 is combined with a spring element 700 that includes free-floating ends 740, a raised resilient band 710, and a middle portion 730 that includes a bent extrusion lip 720 along the center, which acts as the stop and provides tactile feedback for joining the two rail guides 125 from opposite ends of the splice 200 as shown in FIG. 23. The middle portion 730 includes two outwardly extending tabs 731 that fit within the two grooves 221 of the channel 220. Each groove 221 includes an outer lip 222 that retain the tabs 731 within the grooves 221. In the assembled configuration the lips 222 are deformed onto the tabs 731 creating deformed portions that secure the spring 700 to the splice 200. A side and perspective view of the spring element 700 is shown in FIG. 24. The band 710 in the free-floating ends coupled with the extended surface area of on the bent portions 720 provide sufficient surface area to create an electrical bond with the rail guide 125 thereby eliminating the need for sharp penetrating raised portions in earlier embodiments. Alternately the resilient raised band portions can include additional bonding elements such as those included in the other embodiments included herein. A cross sectional view of the assembled version is shown below in FIG. 25. When the rail guides 125 are installed over the splice 200, the bands 710 are compressed and fit entirely within the rail guides 125.

Figure 26:
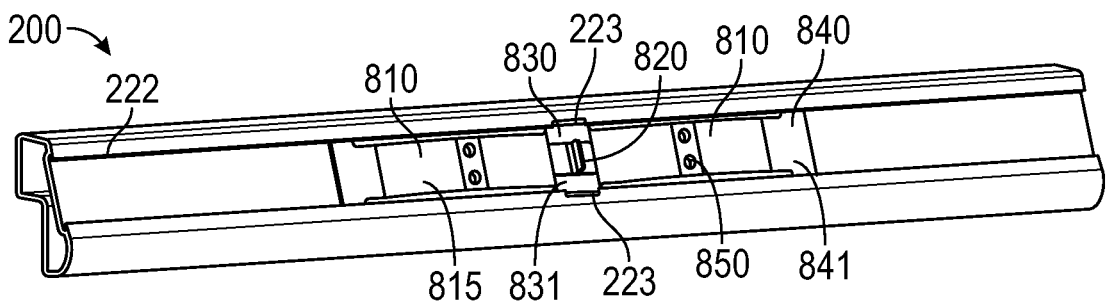
FIG. 26 illustrates a perspective view of the splice of FIG. 10 with an alternate exemplary embodiment of a spring in the channel.
Figure 27:
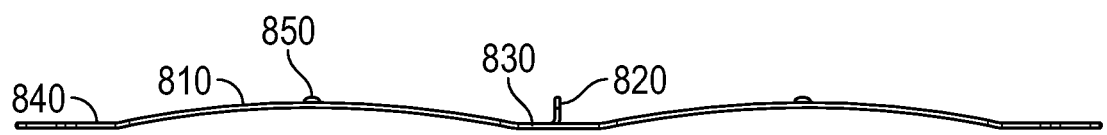
FIG. 27 illustrates a side view of the spring shown in FIG. 26.
Figure 28:
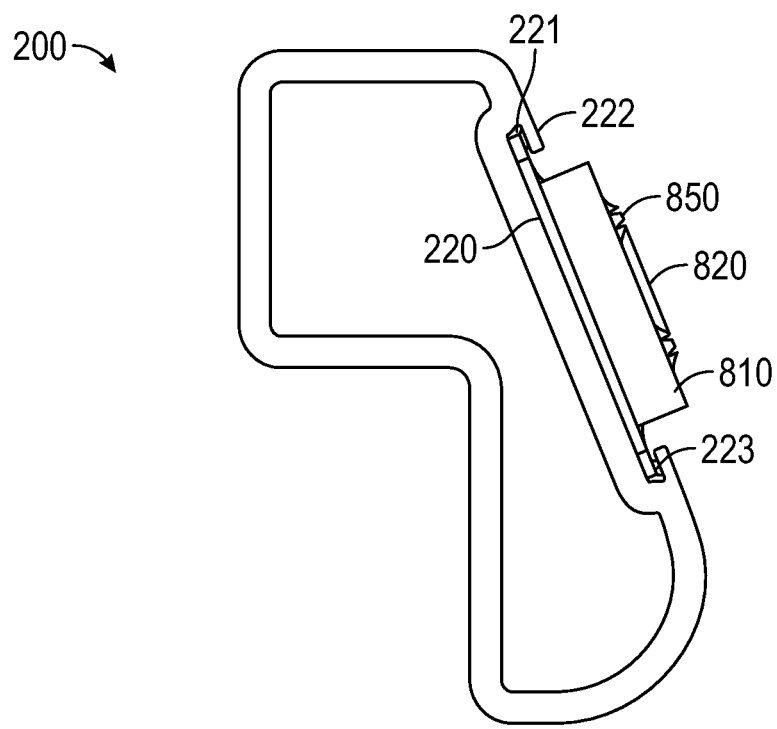
FIG. 28 illustrates an end view of the splice and spring of FIG. 26.

In another exemplary embodiment of a spring, the standard splice 200 of FIG. 10 includes a pair of extruded lips 222 that can be bent downward to secure a spring 800 within the channel 220 as shown in FIG. 26. The spring 800 is similar to the spring of FIG. 24, but the ends 840 include extending tabs 841. The central portion 830 also includes similar extending tabs 831. The extending tabs 841 and 831 slidably fit within the upper and lower grooves 221 or the channel 220 of the splice 200. This embodiment includes the securing deformed portions 223 at the central tabs 831 but not at the outer tabs 841. Thus, the spring 800 is fixed and secured in place by the deforming portions 223 but the ends 840 are able to slide within the grooves 221 allowing the raised resilient band 810 to compress into the channel 220 when the rail 125 is installed and slid over the spring 800. The resilient bands 810 form plateau portions 815 and include a pair of raised sharp elements 850 capable of penetrating the inner surface layers 130 of the rail guides 125 as shown in FIGS. 26, 27 and 28. The central portion 830 includes a vertical portion 820 that acts as a stop and provides tactile feedback as shown in FIG. 26. A side view of the spring is shown below in FIG. 27 and an end view of the assembled splice is shown in FIG. 28. When the rail guides 125 are installed on the splice 200, the resilient bands 810 compress and fit within the channel 220 and the rail guides 125 and the raised elements 850 penetrate the interior surface 130 of the rail guides 125 creating an electrical bond between the two rail guides via the splice.

Figure 29A:
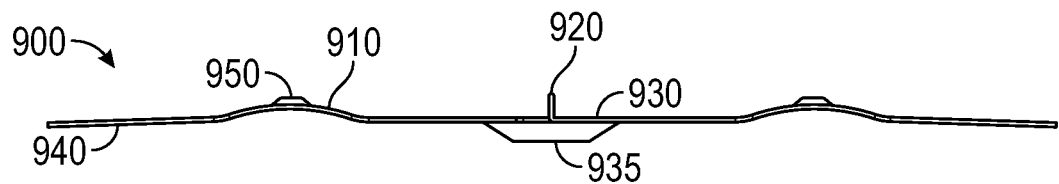
FIG. 29A illustrates a side view of an alternate exemplary embodiment of a spring.
Figure 29B:
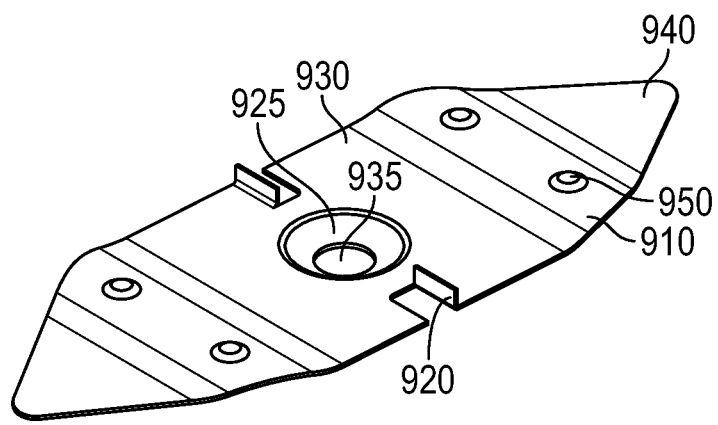
FIG. 29B illustrates a perspective view of the spring in FIG. 29A.
Figure 30A:
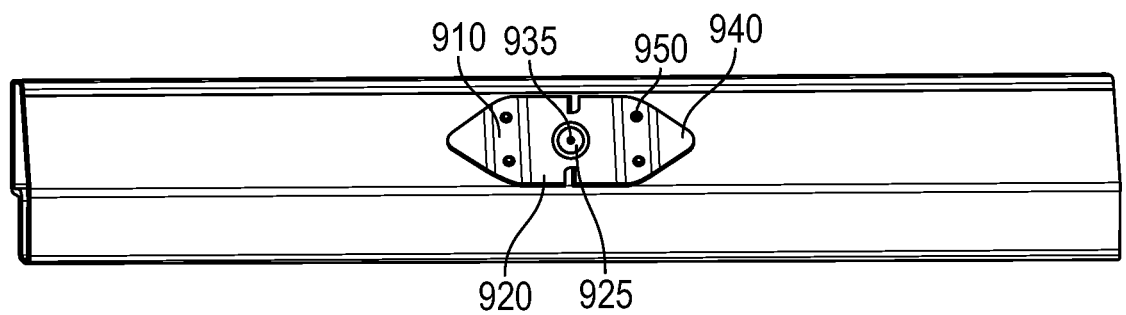
FIG. 30A illustrates a perspective view of the splice of FIG. 10 with a modified narrower channel, and an alternate exemplary embodiment of a spring in the channel.
Figure 30B:
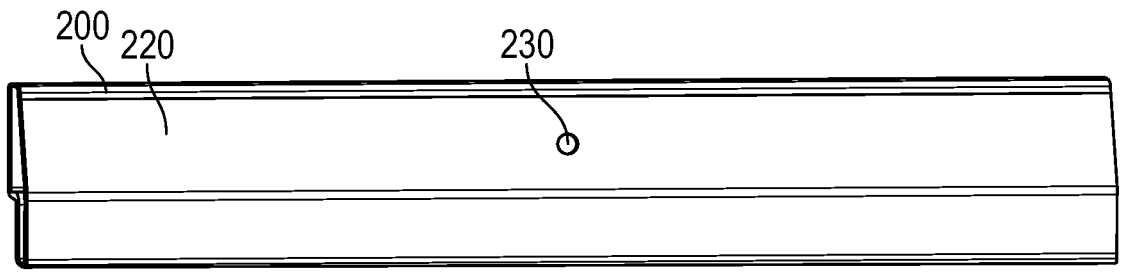
FIG. 30B illustrates a perspective view of another exemplary embodiment of the splice of FIG. 10.
Figure 31:
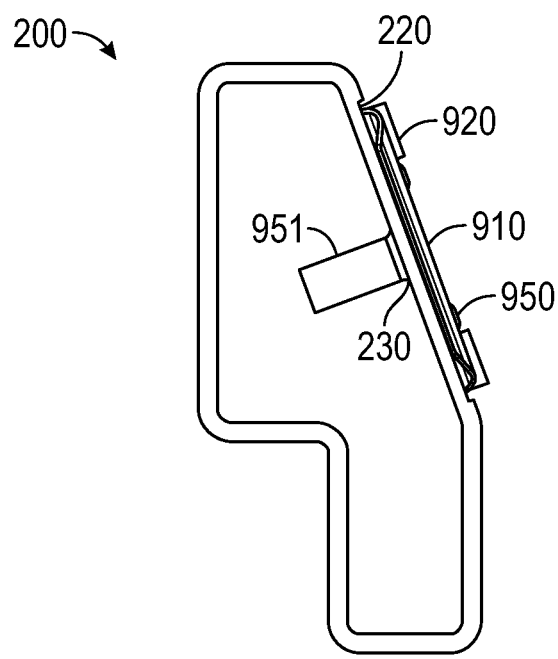
FIG. 31 illustrates an end view of the assembly in FIG. 30A.

FIGS. 29A and 29B illustrate another exemplary embodiment of a spring. The spring 900 includes a thin profile with ends 940, center portion 930, and two pairs of raised sharp bonding elements 950 on plateau portions 910 of the spring 900. The spring 900 further includes vertical tabs 920 on the top and bottom of the center portion 930 of the spring 900 that provide tactile feedback and act as stops to prevent the rail guides 125 from crossing over the center portion of the spring 900. Finally, the spring includes an aperture 935 and recessed portion 925 in the central portion 930 of the spring 900 for receiving a rivet 951, that secures the spring 900 to the splice 200 as shown in the assembled splice and spring in FIG. 30A and the end view of the assembly in FIG. 31. In another exemplary embodiment of the splice 200 of FIG. 10, the splice 200 shown in FIG. 30B is modified to include an opening 230 to receive the rivet 950.

Figure 32:
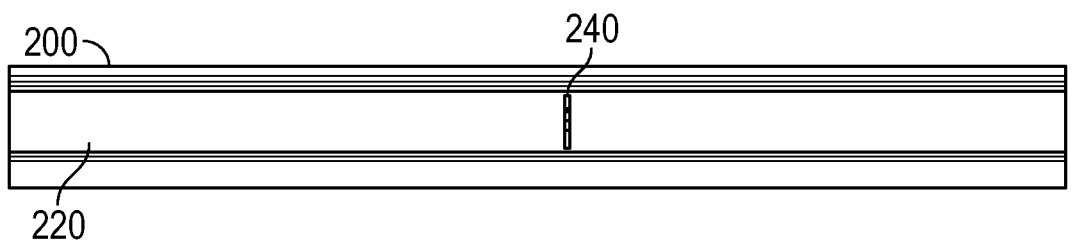
FIG. 32 illustrates a front view of an alternate exemplary embodiment of the splice shown in FIG. 10.
Figure 33A:
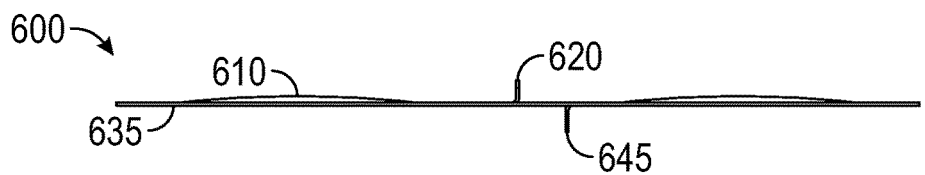
FIG. 33A illustrates a side view of an alternate exemplary embodiment of the spring shown in FIGS. 20-22 in the open position.
Figure 33B:
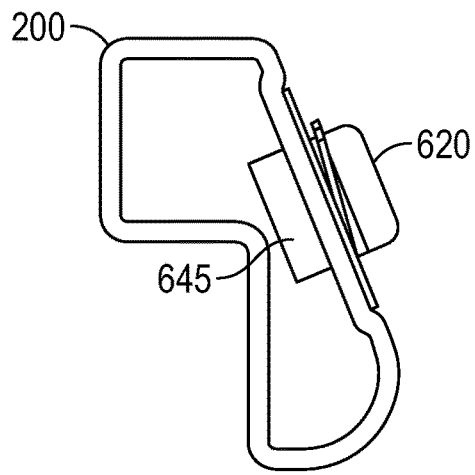
FIG. 33B illustrates an end view of the splice and spring of FIG. 33A in the open position.
Figure 34A:
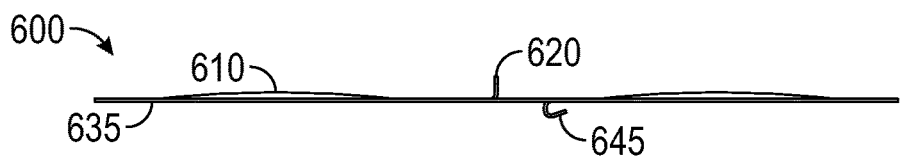
FIG. 34A illustrates a side view of the spring device of FIG. 33A in the locked position.
Figure 34B:
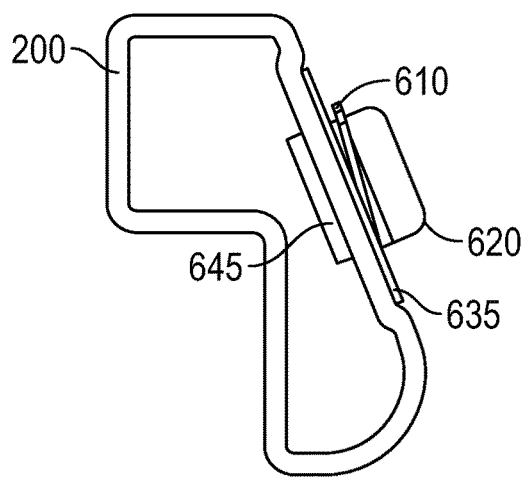
FIG. 34B illustrates an end view of the splice and spring of FIG. 33B in the locked position.
Figure 34C:
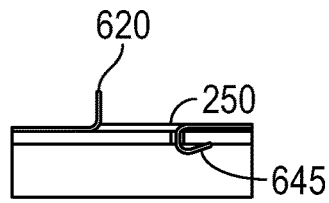
FIG. 34C illustrates a close-up view of the lower vertical tab of FIG. 34B shown in the locked position.
Figure 35:
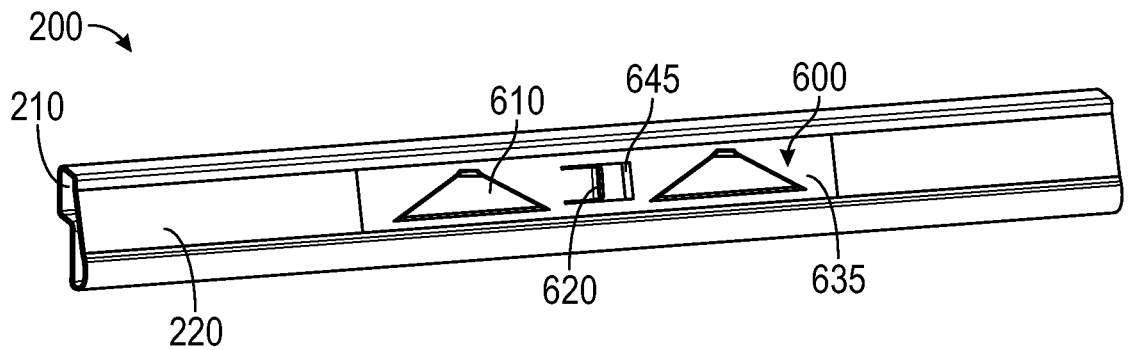
FIG. 35 illustrates a perspective view of the splice and spring of FIGS. 33-34 shown fully assembled.

FIG. 32 illustrates an alternate exemplary embodiment of the splice 200. The splice 200 includes a single slit opening 240 for receiving a bendable flange 645 on the bottom surface of the spring 600 shown in FIG. 33A. A side view of an alternate exemplary embodiment of the spring 600 as shown in FIGS. 20-22B is shown in FIG. 33A. A side view of the spring 600 with the bendable flange 645 inserted into the slit opening 240 of the splice 200 before it is fully assembled to the splice 200 is shown in the end view of FIG. 33B. FIG. 34A illustrates a side view, and 34B illustrates an end view of the spring 600 fully assembled into the splice 200. After the bendable flange 645 is inserted through the slit opening 240 it is bent securing the spring 600 to the splice 200. FIG. 34A shows the spring 600 in the fully assembled condition with the splice 200 not shown for clarity. When assembled, the lower vertical tab 645 is bent to one side to secure the spring 600 to the splice 200 as shown in FIG. 34C. A fully assembled splice 200 and spring 600 is shown in FIG. 35. The spring 600 includes the trapezoidal raised sharp elements 610 on opposite sides of the top surface of the spring 600. The spring 600 also includes an upper vertical stop element 620 in the center of the spring that extends upward and prevents the splice from continuing to slide into the rail past the stop element 620 and further provides tactile feedback when the rail guides 125 are joined on the splice 200.

Figure 20:
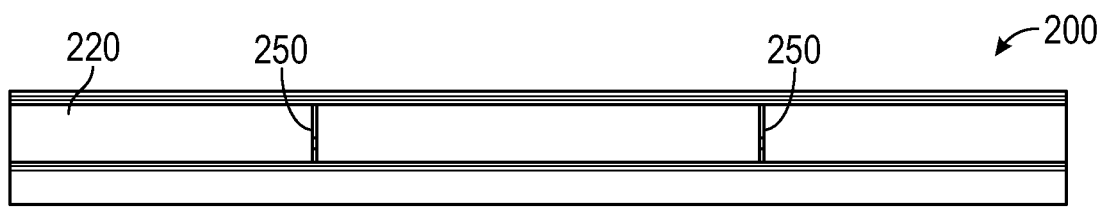
FIG. 20 illustrates a perspective view of an alternate exemplary embodiment of the splice of FIG. 10.
Figure 36:
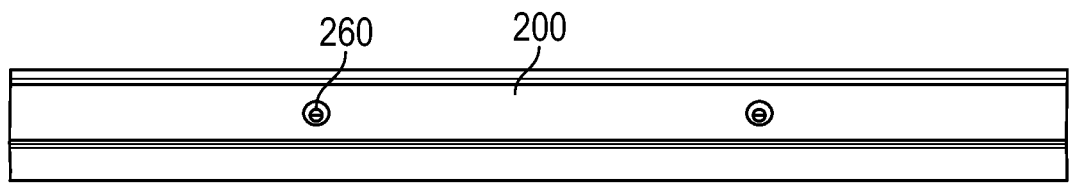
FIG. 36 illustrates a front view of an alternate exemplary embodiment of the splice shown in FIG. 10.
Figure 37:
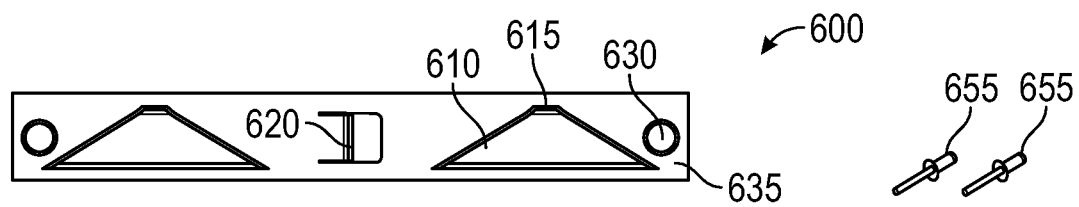
FIG. 37 illustrates a front view of an alternate embodiment of the spring of FIGS. 20-22.
Figure 38:
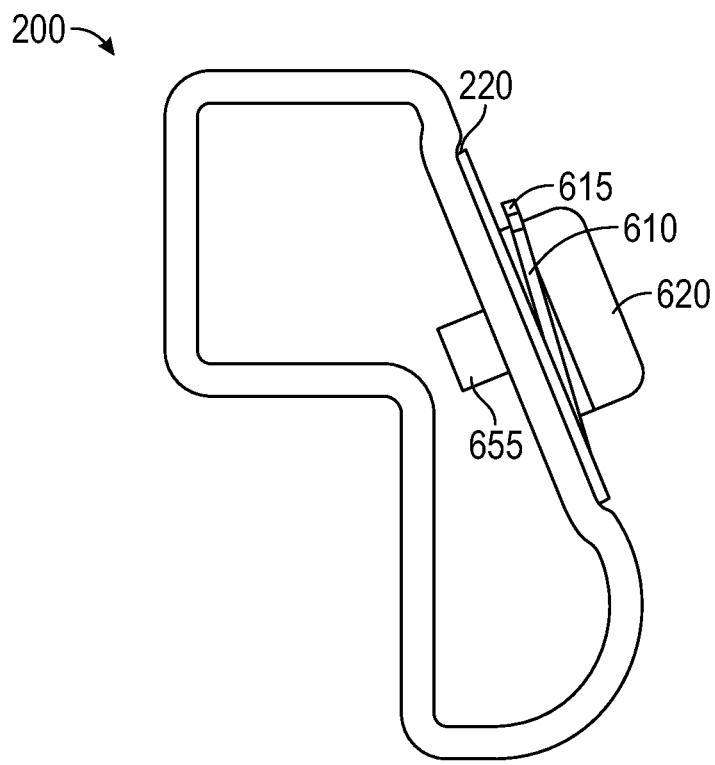
FIG. 38 illustrates an end view of the spring of FIG. 37 assembled with the with the splice of FIG. 36.
Figure 39:
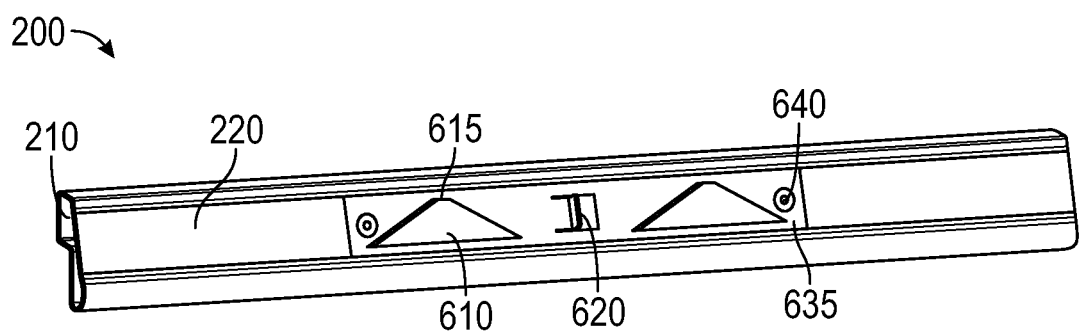
FIG. 39 illustrates a perspective view of the spring and splice shown in FIG. 38.

FIG. 36 illustrates another exemplary embodiment of the splice 200 of FIG. 10. In this embodiment, splice 200 is modified to include two rivet holes 260 as shown. FIG. 37 illustrates an alternate embodiment of the spring 600 as shown in FIGS. 20-22. In this embodiment, the spring 600 still includes the trapezoidal raised bonding elements 610 with sharp edges 615 for penetrating the inside surface 130 of the rail guides 125. It also includes the single vertical tab 620 on the top surface of the spring 600 for providing tactile feedback and to act as a stop to prevent the splices 200 from moving across the center of the spring 600. The spring also includes a pair of apertures 630 on opposite sides of the spring 600 for receiving rivets 655 that secure the spring 600 inside the channel 220 of the splice 200. An end view of the assembled splice 200 and spring 600 is shown as FIG. 38. A front perspective view of a fully assembled splice 200 and spring 600 is shown in FIG. 39.

Figure 40:
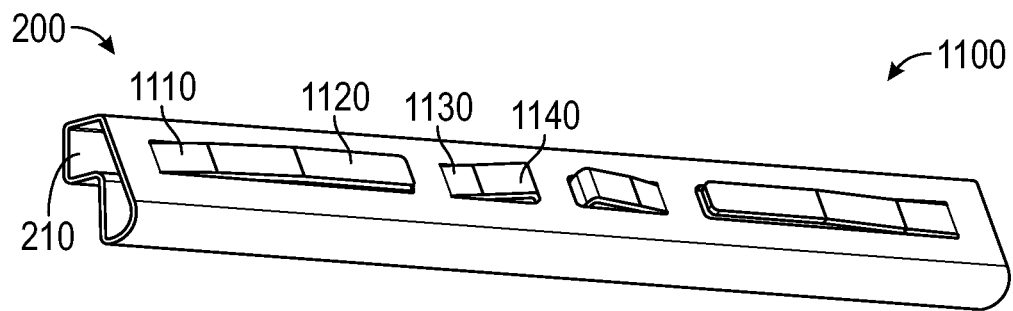
FIG. 40 illustrates a front perspective view of an alternate exemplary embodiment of the splice shown in FIG. 10.
Figure 41:
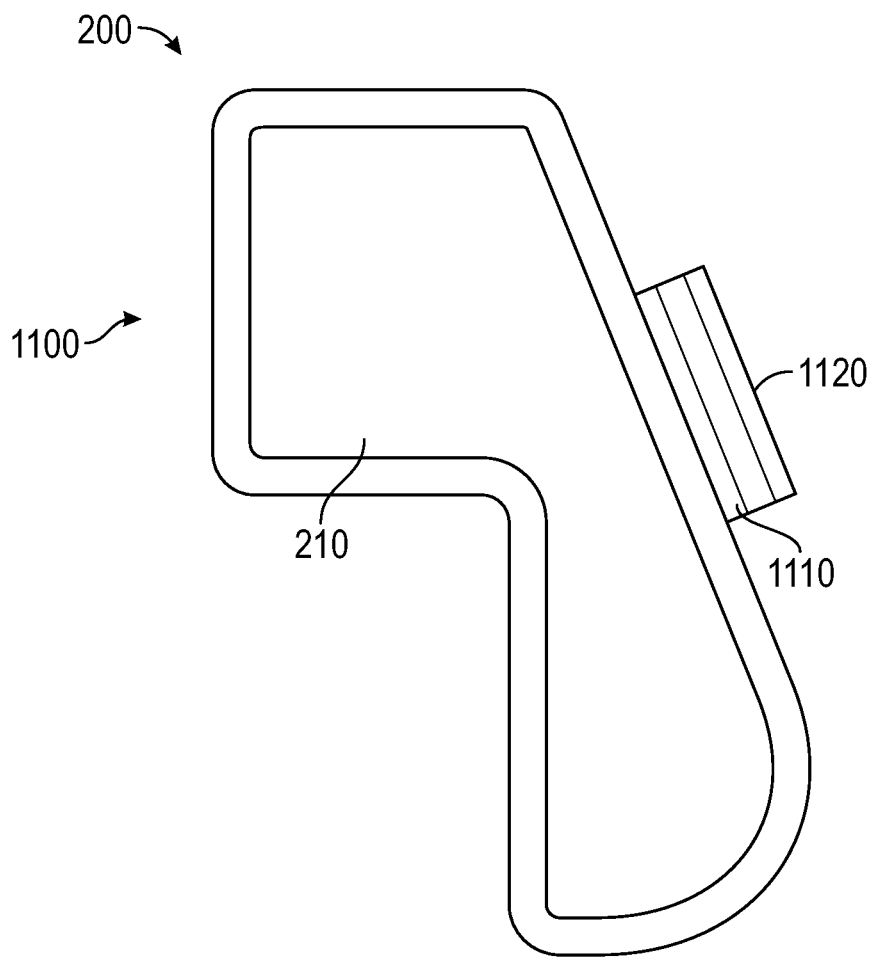
FIG. 41 illustrates an end view of the splice shown in FIG. 40.

FIG. 40 illustrates another exemplary embodiment of the splice 200 of FIG. 10. In this embodiment, the splice 200 and spring elements are combined to create a single component as shown. The splice 200 is formed using a single extrusion and includes a pair of elevated bonding features 1120 that are coupled at rear ends 1110 of the elevated bonding features 1120. Each bonding feature 1120 provides resistance and electrical bonding as a rail guide 125 moves across the splice 200 from either the left or the right side. The splice 200 also includes a pair of stopping features in the form of raised elements 1140 on each side of the center of the splice 200. These raised elements 1140 are also coupled at rear ends 1130 of the raised elements 1140. When a rail guide 125 reaches the center of the splice 200, it rests against the raised element 1140 on the opposite side of the splice 200 and stops. An end view of the splice 200 is also shown in FIG. 41.

Figure 42:
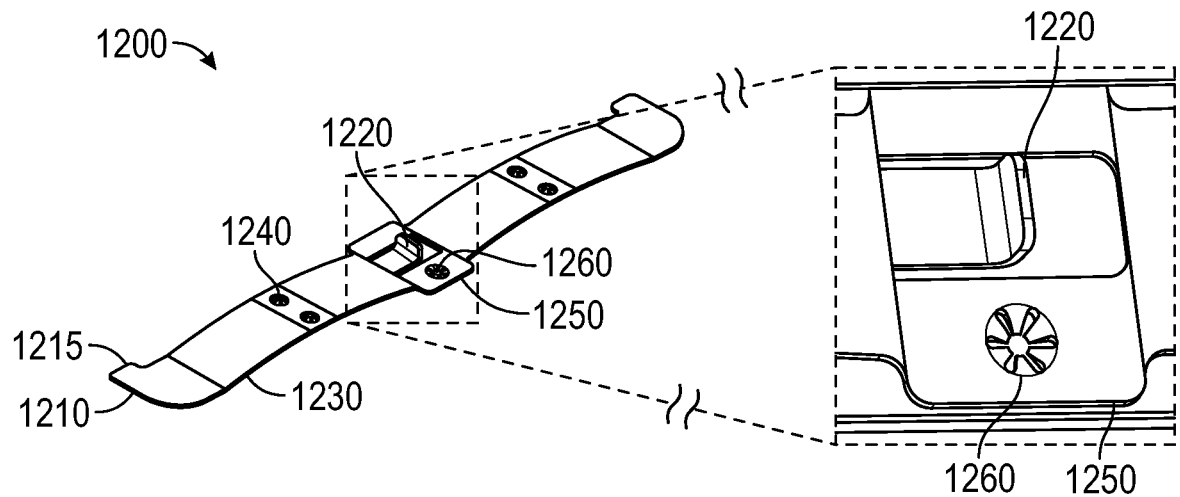
FIG. 42 illustrates both a perspective view of an alternate exemplary embodiment of a spring, and a close-up view of the center portion of the spring.
Figure 43:
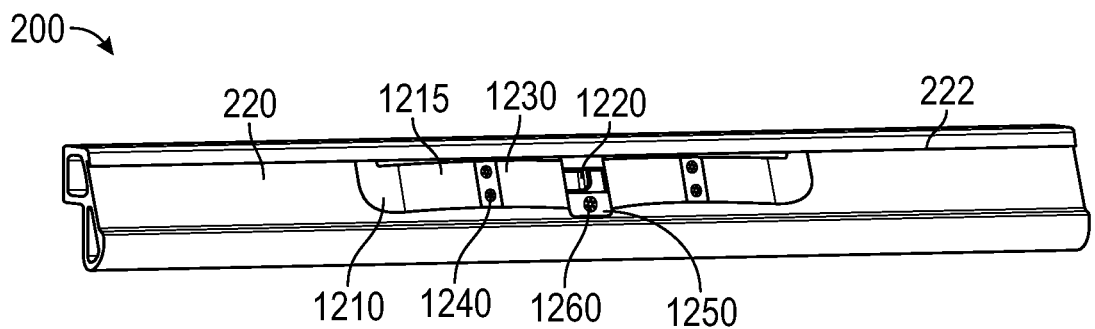
FIG. 43 illustrates a perspective view of the assembled version of the spring in FIG. 42 with the splice 200.
Figure 44:
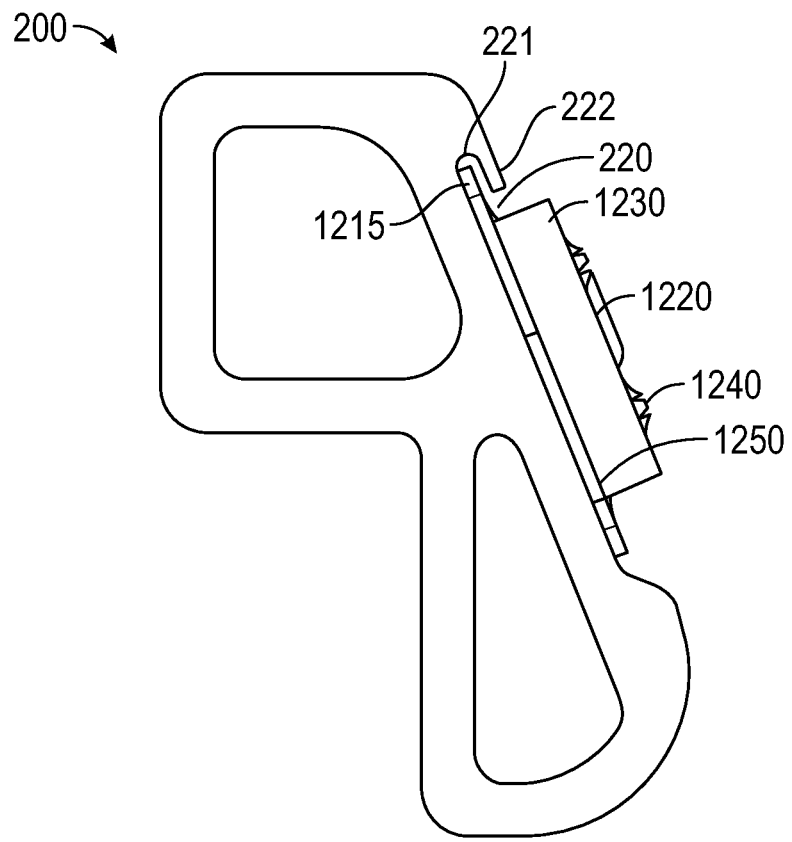
FIG. 44 illustrates an end view of the splice and spring shown in FIG. 43.

FIG. 42 illustrates another exemplary embodiment of a spring. The spring 1200 includes an upward extending tab 1215 on each end 1210, a pair of raised sharp elements 1240 on the plateau portion of a raised resilient band 1230 of each side of the spring 1200 as shown, a vertical tab 1220 that extends upward from the center 1250 of the spring 1200 that provides a stop mechanism and tactile feedback for when the rail guide 125 reaches the center of the spring, and a star-shaped feature 1260 positioned in the central portion 1250 that protrudes downward. This embodiment requires that there be only one groove 221 and lip 222 that extends along the length of the splice 200 as shown in the assembled splice 200 and spring 1200 in FIG. 43 and an end view also showing the assembled version in FIG. 44. The spring tabs 1215 easily slide under the groove lip 222. No "threading" of the spring 1200 is required during manufacture. Once the spring 1200 is in place, the lower center portion 1250 of the spring 1200 is "hit" which deforms spring material of the star-shaped feature 1260 into the extrusion to in turn hold the spring 1200 in place by clinching.

Figure 45:
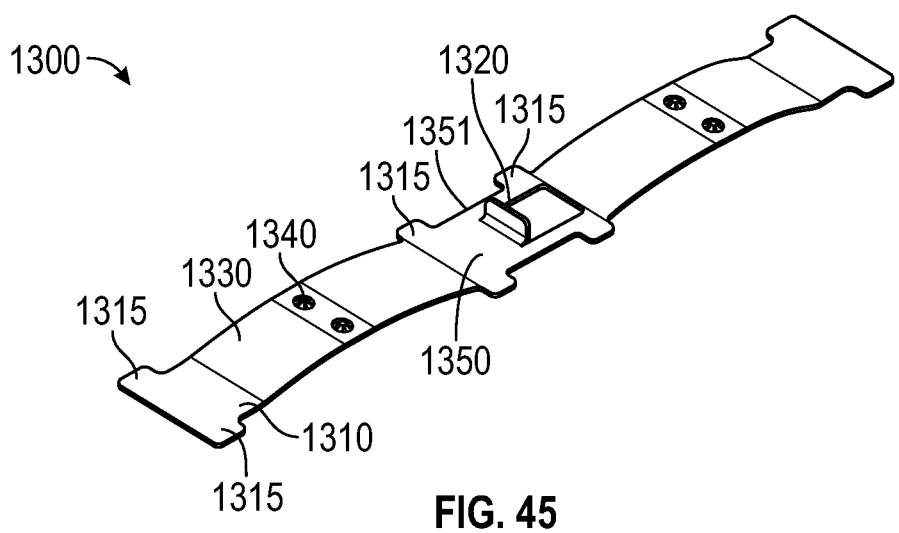
FIG. 45 illustrates a perspective view of another exemplary embodiment of a spring.
Figure 46:
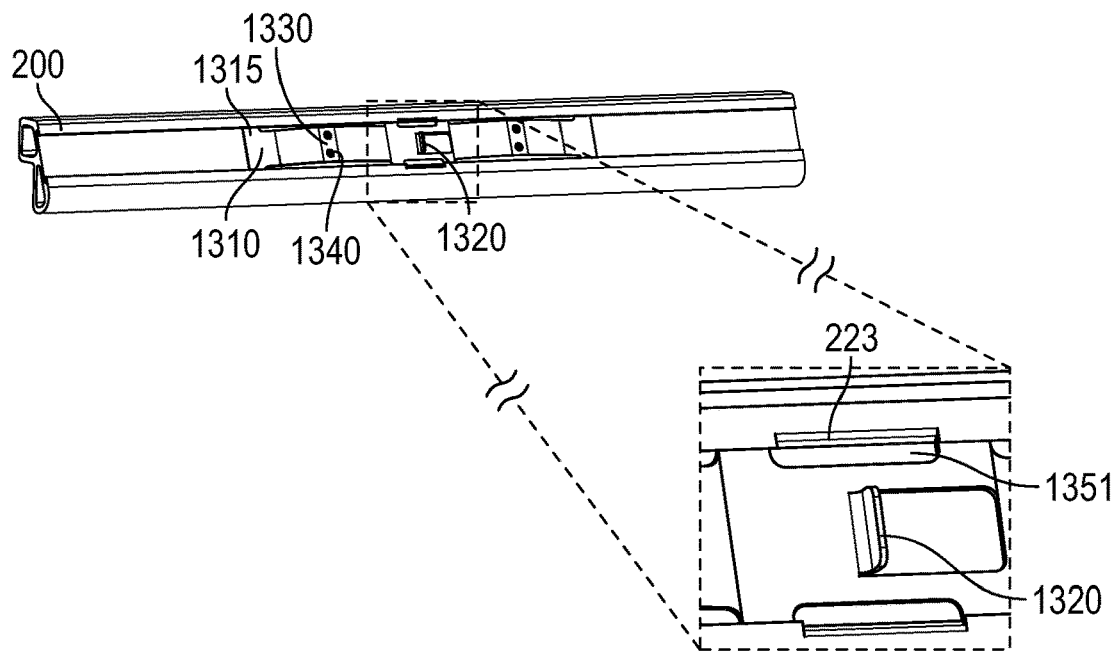
FIG. 46 illustrates both a perspective view of the spring of FIG. 45 with an alternate exemplary embodiment of the splice of FIG. 10, and a close-up view of the center portion of the spring and splice.
Figure 47:
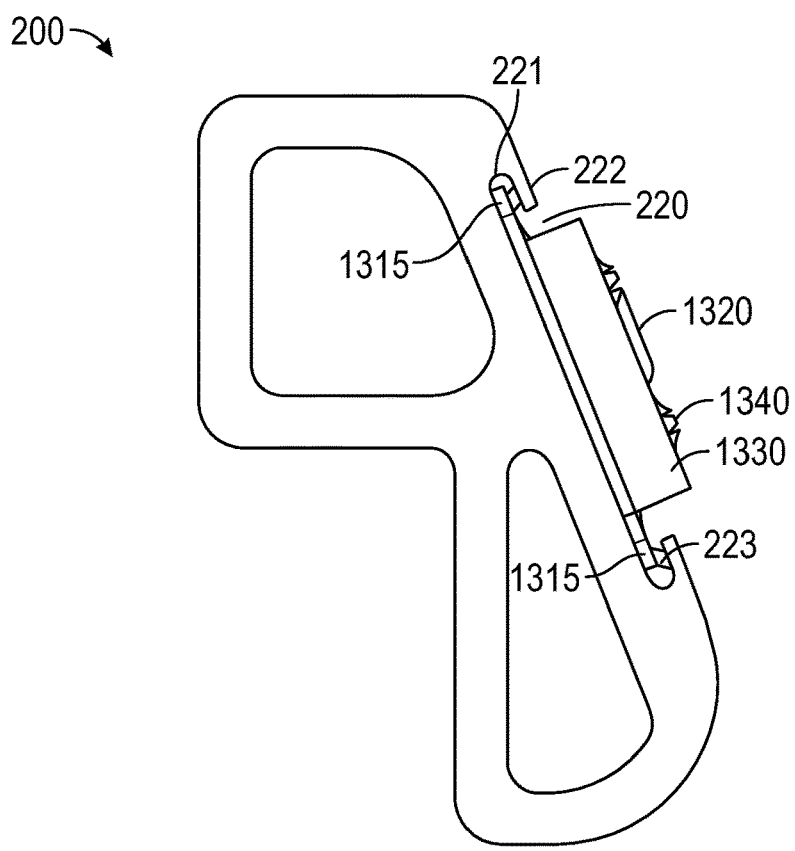
FIG. 47 illustrates an end view of the splice and spring shown in FIG. 46.

FIG. 45 illustrates another exemplary embodiment of a spring. In this embodiment, a spring 1300 is shown. The spring 1300 includes two ends 1310. The ends include outwardly extending tabs 1315 that fit slidably within the grooves 221 of the channel 220 of the splice 200. The spring 1300 also includes a central portion 1350 and this central portion 1350 also includes extending tabs 1315. Each side of the central portion 1350 has two tabs 1315 with a space between them forming a tab recess 1351. The groove lip 222 is pressed into the tab recess 1351 preventing the spring 1300 from sliding in the channel 220 because the deformed portion 223 of the lip 222 obstructs the path of the tabs 1315 through the grooves 221. The plateau portions of resilient bands 1330 on each side of the spring 1300 include a pair of raised sharp elements 1340 that penetrate the interior surface 130 of the rail 125 and a vertical tab 1320 that extends upward from the central portion 1350 of the spring 1300 that provides a stop mechanism and tactile feedback for when the rail guide 125 reaches the center 1350 of the spring 1300 similar to that shown in FIG. 42. A fully assembled spring 1300 with the splice 200 is shown in FIG. 46. An end view of the spring 1300 and the splice 200 is shown in FIG. 47.

Figure 48:
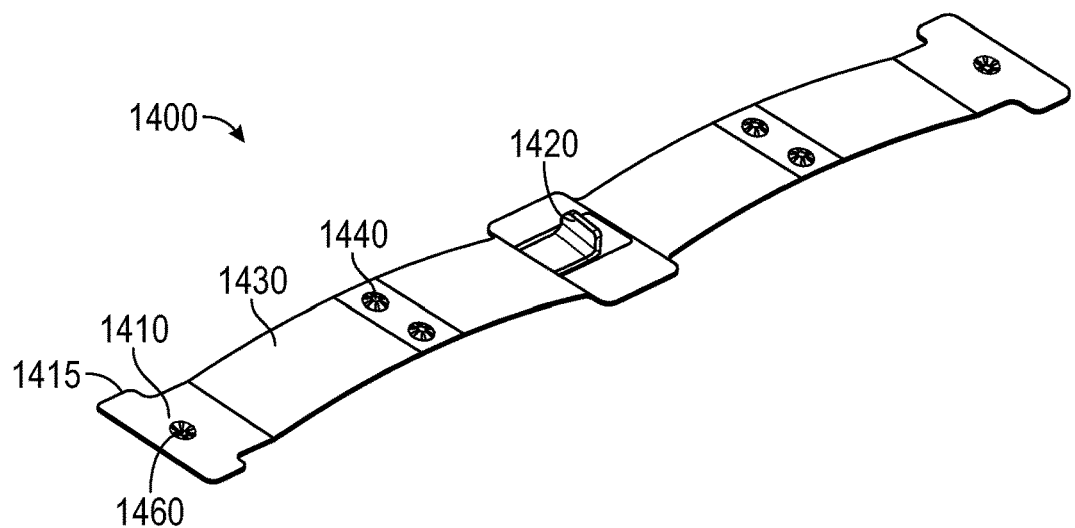
FIG. 48 illustrates a perspective view of another exemplary embodiment of a spring.
Figure 49A:
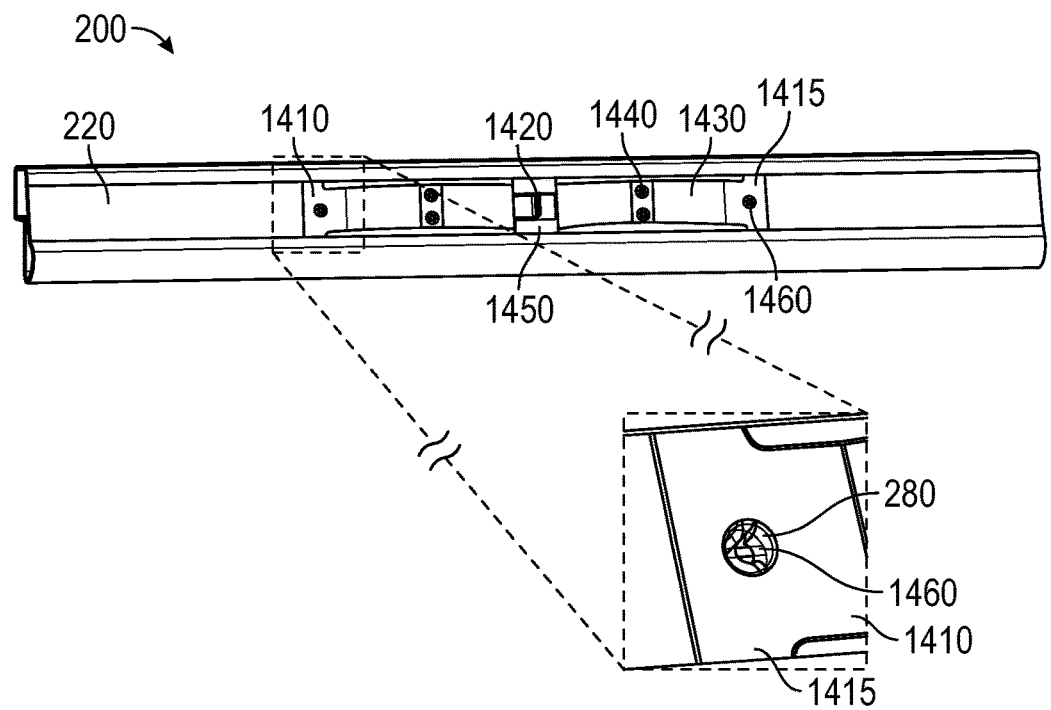
FIG. 49A illustrates both a perspective view of the spring of FIG. 48 with the alternate exemplary embodiment of the splice of FIG. 49B, and a close-up view of the end portion of the spring and splice.
Figure 49B:
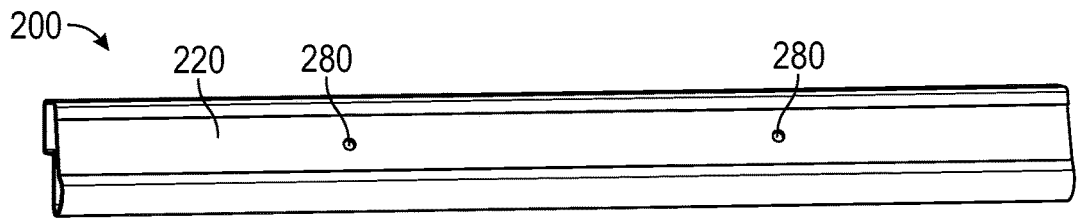
FIG. 49B illustrates a perspective view of another exemplary embodiment of the splice of FIG. 10.

In another exemplary embodiment of the splice 200 of FIG. 10, FIG. 49B illustrates a perspective view of the splice 200 that includes a pair of apertures 280 on each side of the splice 200 within the channel 220 about a ¼ of the distance from the end of the splice 200. In another exemplary embodiment of a spring, the spring 1400 is shown in FIG. 48. This spring 1400 is similar to the spring 1300 of FIG. 45. Two ends 1410 and a central portion 1450 include extending tabs that slidably extend into the grooves 221 of the channel 220 of the splice 200. The plateau portions of raised resilient bands 1430 on each side of the spring 1400 include a pair of raised bonding elements 1440. The spring 1400 includes a vertical stop 1420 that extends upward from the center 1450 of the spring 1400 that provides a stop mechanism and tactile feedback for when the rail guide 125 reaches the center of the splice 200 as that shown in FIG. 48. The spring 1400 includes a downward protrusion 1460 whereby the protrusions 1460 fit within the apertures 280 in the channel 220 of the splice 200. Also, unlike the spring 1300, the center 1450 of the spring 1400 does not have a recessed portion like the tab recess 1351 of the center 1350 of spring 1300.

Figure 50:
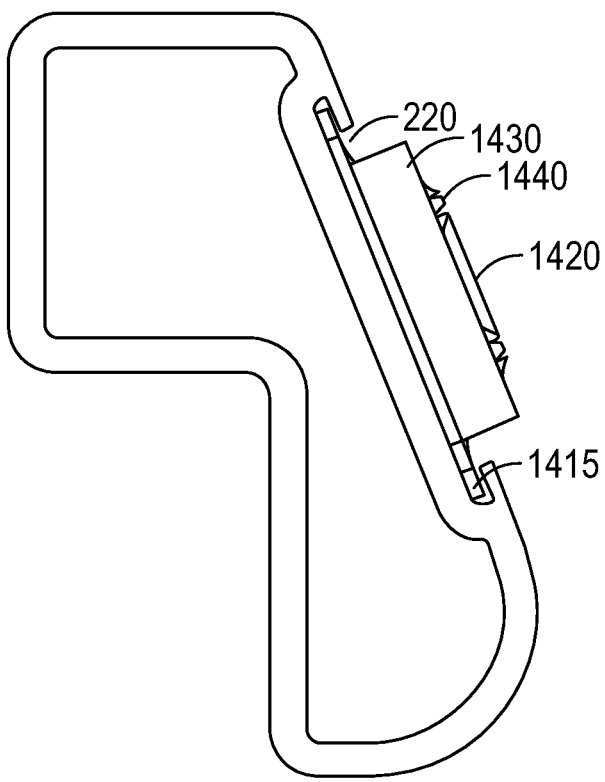
FIG. 50 illustrates an end view of the splice and spring shown in FIG. 49A.

FIG. 49A illustrates the fully assembled spring 1400 and splice 200, when the protrusions 1460 fit within the apertures 280 of the channel 220, the spring 1400 is secured within the channel 220 as shown in the close-up view of FIG. 49A. An end view of the fully assembled splice 200 and spring 1400 is shown in FIG. 50.

Figure 51:
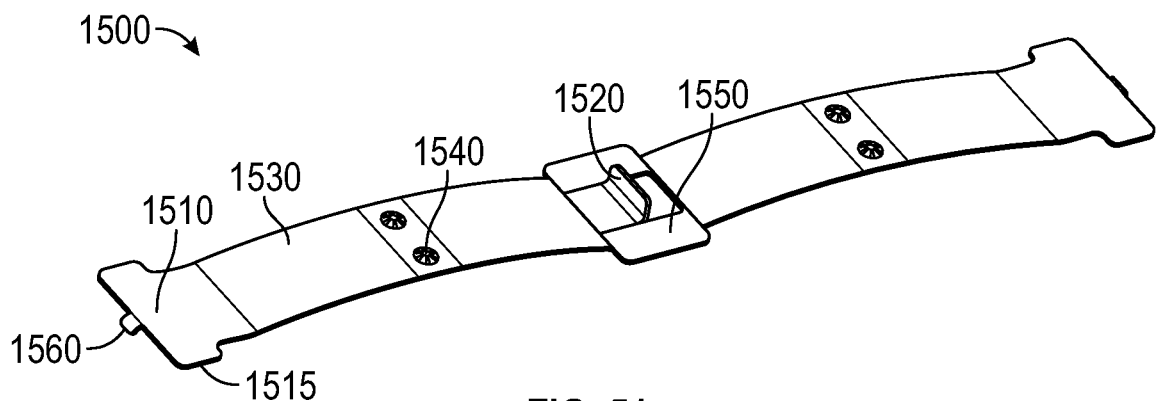
FIG. 51 illustrates a perspective view of another exemplary embodiment of a spring.

In another exemplary embodiment of a spring, the spring 1500 is shown in FIG. 51. This spring 1500 is similar to the spring 1400 of FIG. 48. Two ends 1510 are approximately the same width as the channel 220 of the splice 200. The ends 1510 and the center 1550 have tabs 1515 that extend into the channel grooves 221. The plateau portions of raised resilient bands 1530 on each side of the spring 1500 include a pair of raised sharp bonding elements 1540 and the spring 1500 has a vertical tab 1520 that extends upward from the center 1550 of the spring 1500 that provides a stop mechanism and tactile feedback for when the rail guide 125 reaches the center of the spring as that shown in FIG. 51. The spring 1500 includes the ends 1510 with extended portion 1515 and a downward extending vertical tab 1560.

Figure 52:
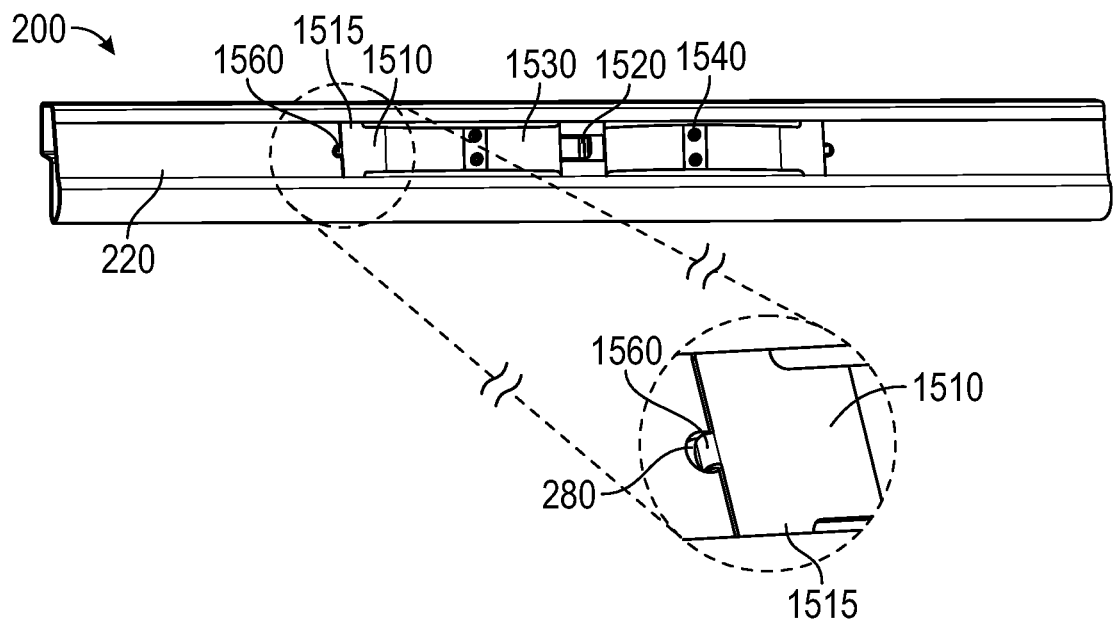
FIG. 52 illustrates both a perspective view of the spring of FIG. 51 with the alternate exemplary embodiment of the splice of FIG. 48 showing a modified aperture to receive a downward extending tab, and a close-up view of the end portion of the spring and splice.
Figure 53:
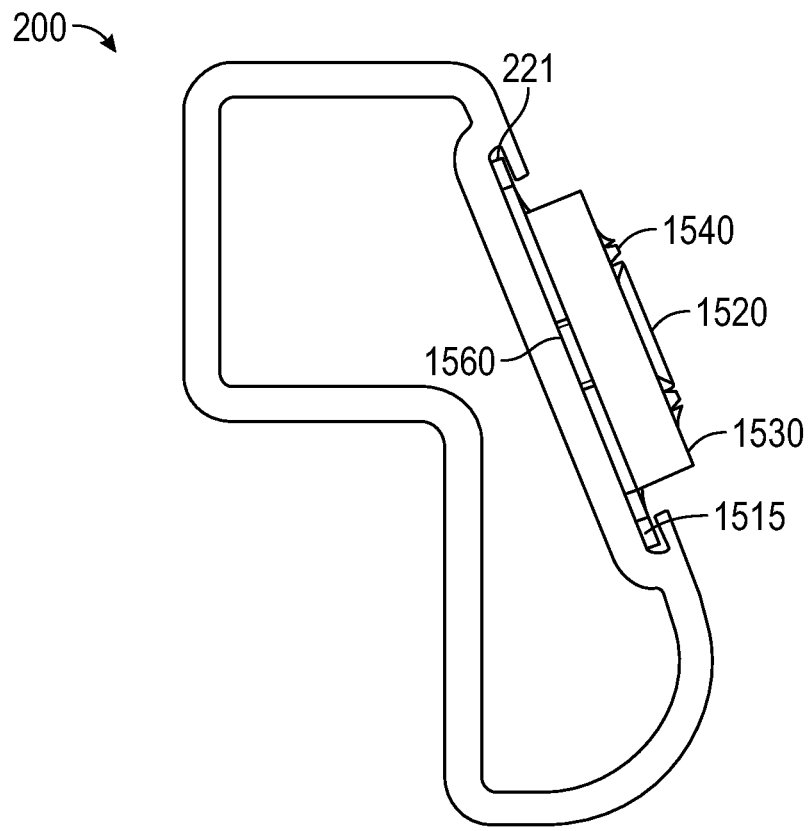
FIG. 53 illustrates an end view of the splice and spring shown in FIG. 52.

As shown in FIG. 52, the splice 200 includes a pair of apertures 280 such that the apertures 280 are modified from receiving the protrusions 1460 in the ends 1410 of the spring 1400, to instead receiving the downward extending vertical tabs 1560 as shown in the close-up view of the spring 1500 of FIG. 52. By inserting the tabs 1560 into the apertures 280, the spring 1500 is secured within the channel 220. A fully assembled version of the spring 1500 and splice 200 is shown in FIG. 52 and an end view of the fully assembled splice 200 and spring 1500 is shown in FIG. 53.

Figure 54:
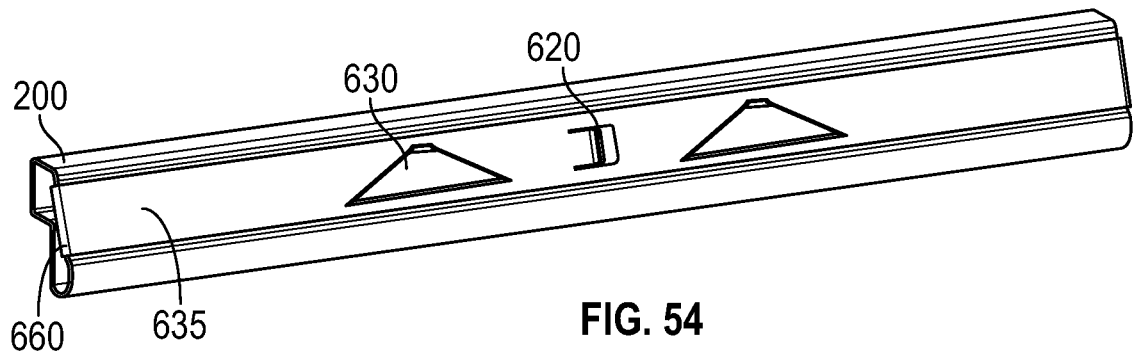
FIG. 54 illustrates a perspective view of a modified splice of FIG. 32 and spring assembly based on the spring shown in FIG. 33.
Figure 55:
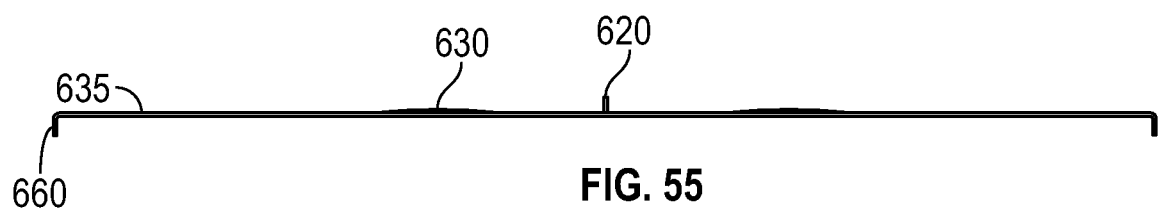
FIG. 55 illustrates a side view of the spring shown in FIG. 54.
Figure 56:
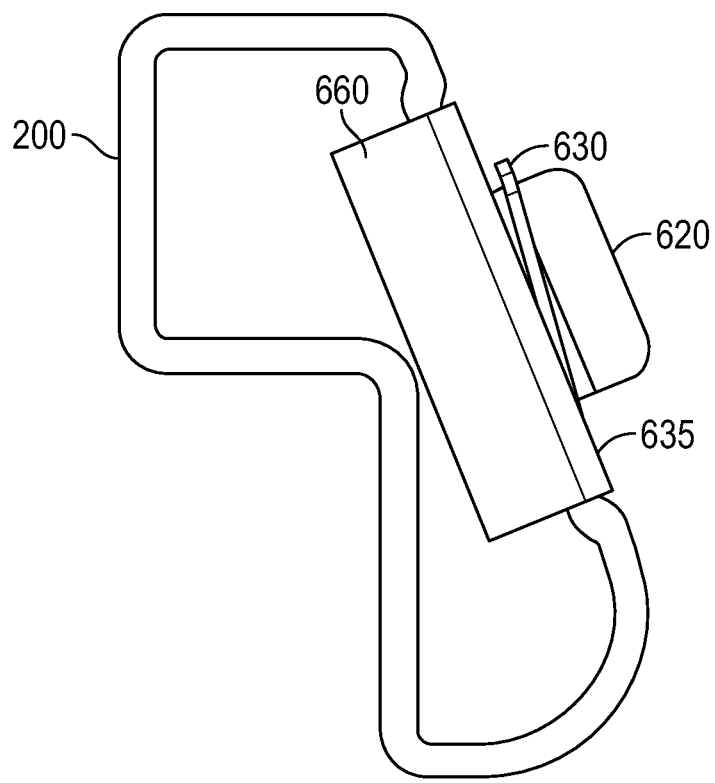
FIG. 56 illustrates an end view of the spring and splice assembly of FIG. 54.
Figure 57:
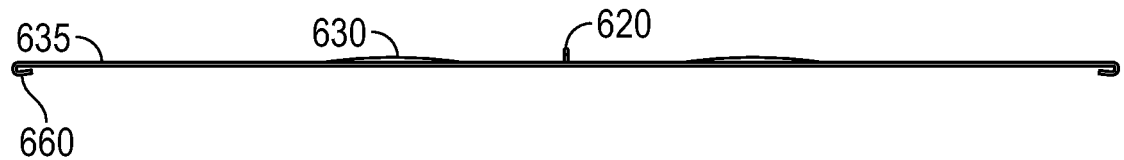
FIG. 57 illustrates a side view of the spring shown in FIG. 54 with bent ends.
Figure 58:
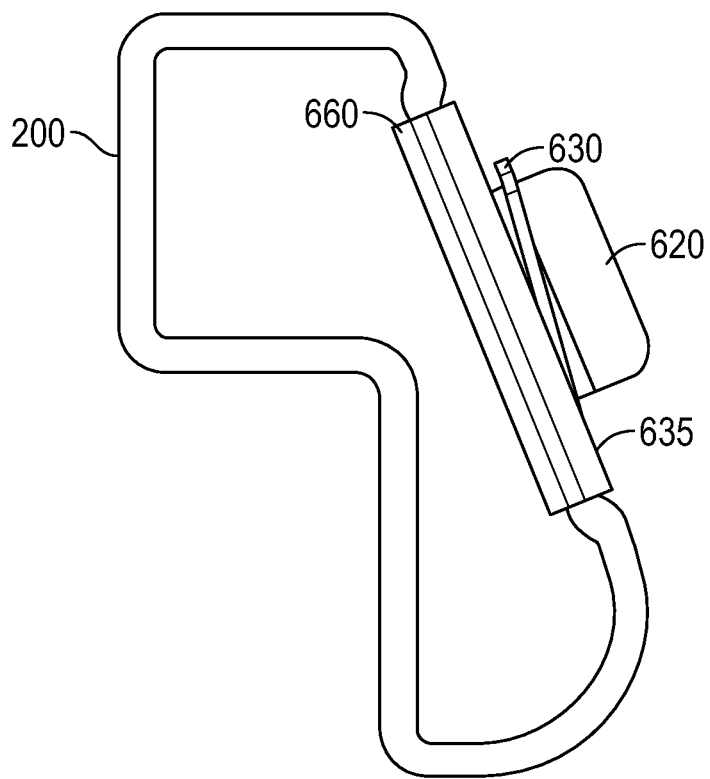
FIG. 58 illustrates an end view of the spring and splice assembly of FIG. 54 with the ends of the spring being bent.

FIG. 54 illustrates another exemplary embodiment of the spring and splice assembly that is similar to the embodiment disclosed and described in FIGS. 32-35 above. In this embodiment, the channel 220 of the splice 200 includes no slit opening. Instead, as shown in the fully assembled spring 600 and splice 200 of FIG. 54, the spring 600 extends over the entire length of the splice channel 220. As shown in a pre-assembled version of the spring 600 and splice 200 assembly in FIG. 55, the spring 600 includes a pair of downwardly extending tabs 660 on each end 635 at the respective edges of the splice 200. An end view before assembly completion is also shown in FIG. 56. Once the spring tabs 660 are bent at the respective edges of the splice 200, the spring 600 is secured to the splice as shown in FIG. 57 and in the end view of the completed assembly in FIG. 58.

Figure 59A:
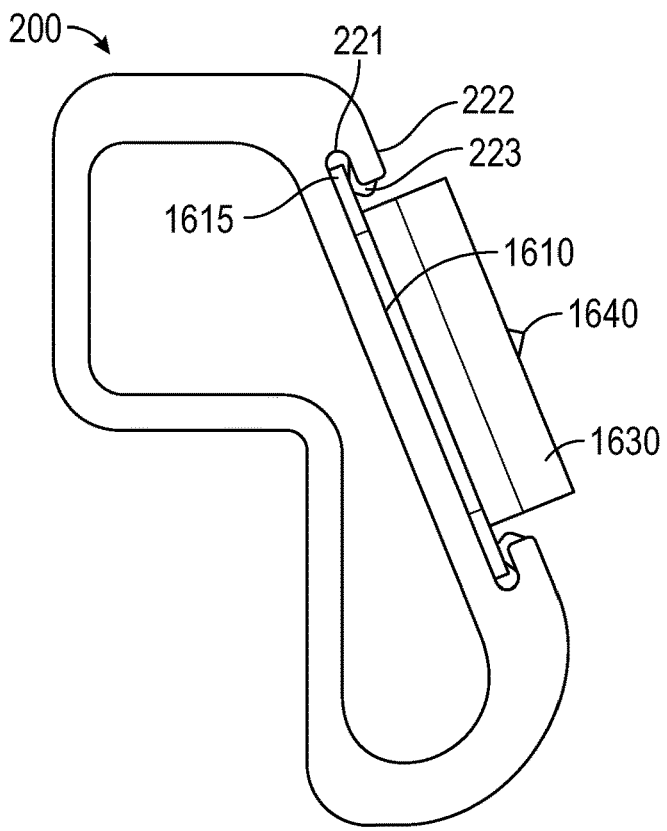
FIG. 59A illustrates an end view of a modified splice of FIG. 10 and spring assembly based on the spring shown in FIG. 62.
Figure 59B:
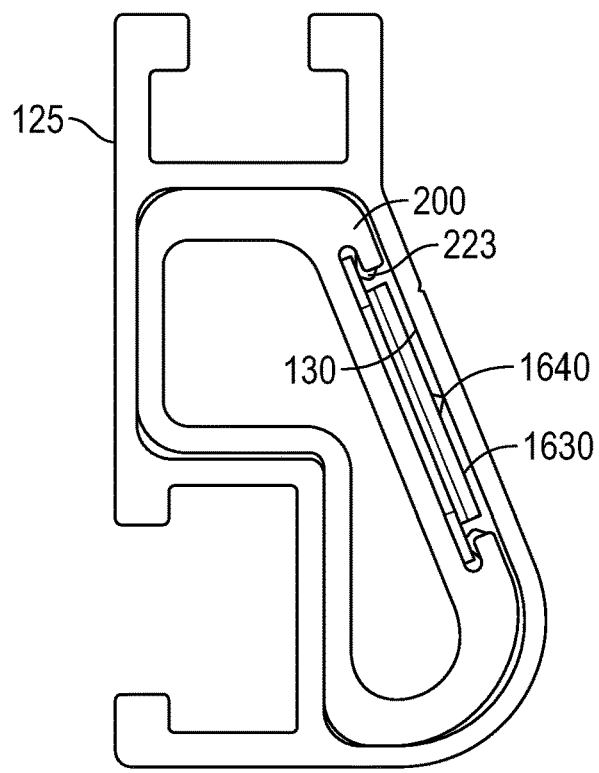
FIG. 59B illustrates an end view of the spring and splice assembly of FIG. 59A fully inserted into the rail guide of FIG. 7.
Figure 60:
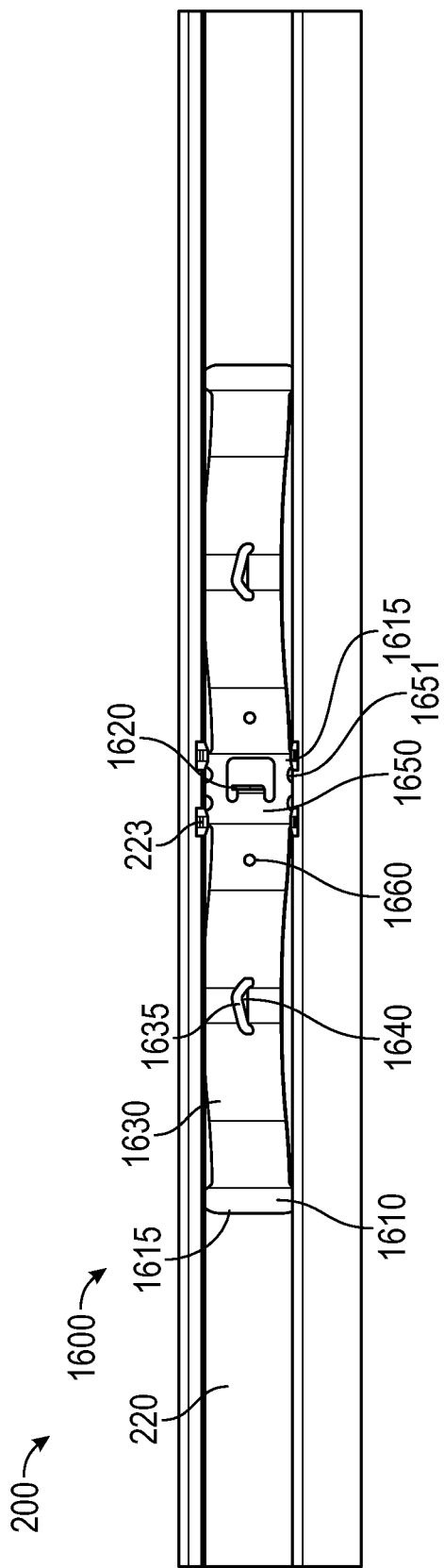
FIG. 60 illustrates a front view of an assembled spring and splice assembly of FIG. 62.
Figure 62:
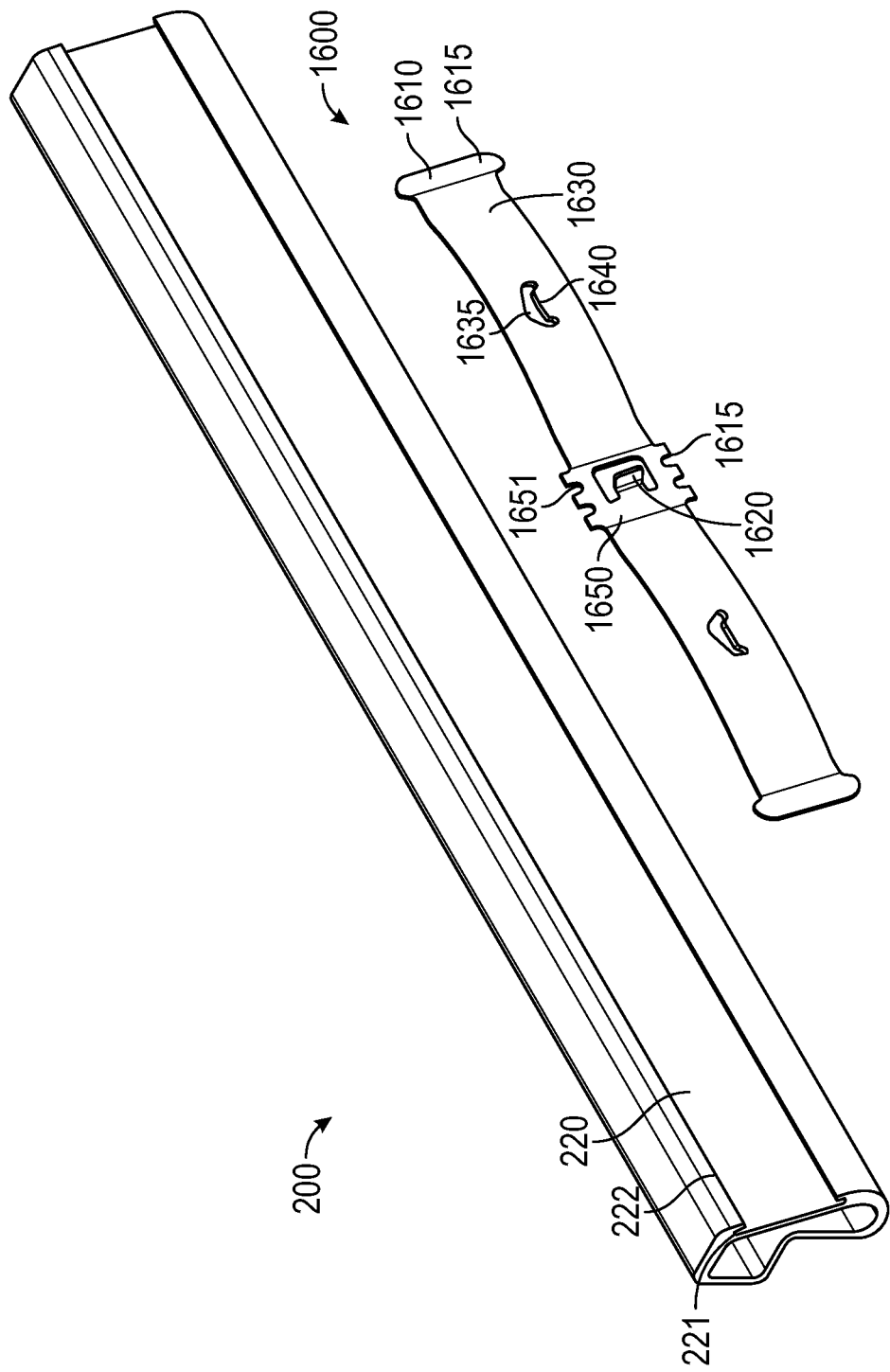
FIG. 62 illustrates a perspective view of the splice and an alternate exemplary spring.

FIGS. 59A-62 illustrate another exemplary embodiment of a spring and splice assembly. In FIG. 62, a perspective view of a spring 1600 is shown. The spring 1600 includes two ends 1610 and a central portion 1650 that are wider than the opening between the lips 222 of the channel 220 of the splice 200. The ends 1610 and the central portion 1650 include edge portions 1615 that extend into the grooves 221 of the channel 220 of the splice 200. The edge portions 1615 of the central portion 1650 include notches 1651. The lip 222 of the groove 221 of the channel 220 is deformed downward against the edge portions 1615 forming deformed portions 223. The deformed portions 223 can be pressed down directly on the edge portions 1615 in the central portion 1650 or overlapping the edges of the tabs 1615 as shown in FIG. 60. Alternately the deformed portions 223 can be pressed into the notches 1651. Prior to the deformation of the lip 222 the spring 1600 can slide along the channel 220. After the lip 222 is deformed as described the spring 1600 and the splice 200 are secured together and the sliding of the spring 1600 along the channel 220 is restricted because the deformed portions 223 obstruct the path of the edge portions 1615 along the groove 221.

The plateau portions of raised resilient bands 1630 on each side of the spring 1600 include a pair of raised sharp triangular bonding elements 1640 that extend upward from the resilient bands 1630 and form openings 1635. The center portion 1655 of the spring includes a vertical tab 1620 that extends upward from the center portion 1655 and provides a stop mechanism and tactile feedback for when the rail guide 125 reaches the center 1655 of the spring 1600. There are a variety of bonding elements described herein and associated with the different spring embodiments. It is understood that different bonding elements can be used on the various embodiments and are limited to the embodiments with which they are shown in the figures and described herein.

In this spring 1600, a location indicator 1660 is positioned just outside the center portion 1655 of the spring 1600 on the lower portions of the raised resilient bands 1630. These location indicators provide a visual indication of the proper location of the ends of the rail guides 125 when the splice is located at an expansion joint in the rail. This scenario occurs when the joined rails' combined thermal expansion requires a gap between the ends of the rail guides 125 to avoid bending of the rail guides 125. This allows the installer to space the rail guides 125 properly without having to measure. The indicators 1660 are shown as circles in FIG. 60. It is understood that the indicators can be circles, lines, or any appropriate shape. It is further understood that the location indicators shown in this spring embodiment can be used in any of the splice embodiments described herein.

A fully assembled spring 1600 with the splice 200 assembly is shown in FIG. 60. A side cross-sectional view of the spring 1600 and the splice 200 is shown in FIG. 59A. FIG. 59B illustrates a side view of the splice 200 fully inserted into the rail guide 125. FIG. 61A illustrates a perspective view of the splice 200 with spring 1600 and the rail guide 125 with inside surface 130. FIG. 61B illustrates a perspective view of the splice 200 inserted into the rail 125 with the splice 200 contacting the inside surface 130 of the rail 125. When the splice 200 is fully inserted into the rail guide 125 as shown in FIG. 59B, the sharp point on the raised triangular elements 1640 will penetrate the surface 130 of the rail guide 125 and form an electrical bond.

Figure 66A:
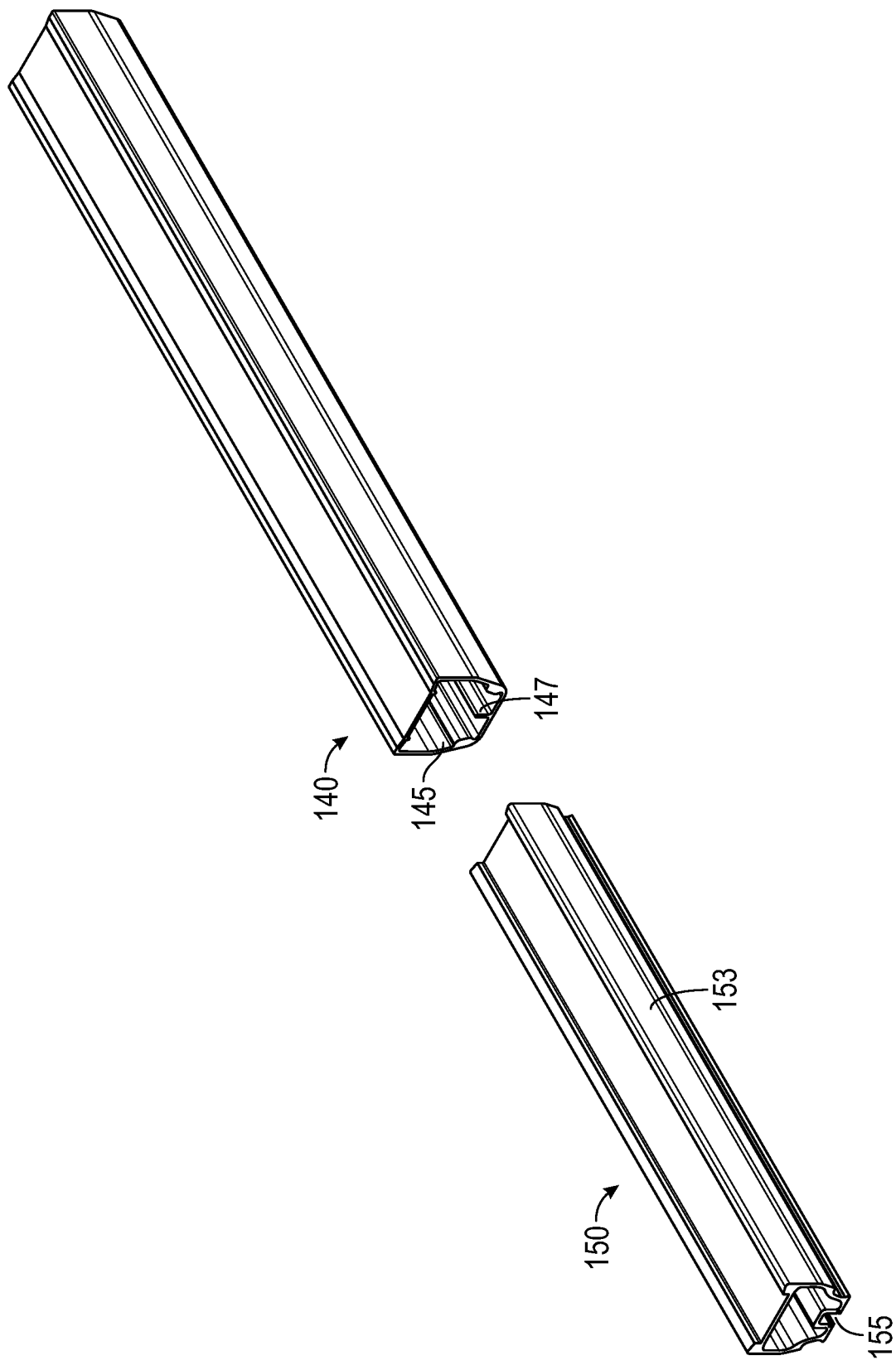
FIG. 66A illustrates a perspective view of an alternate exemplary embodiment of a splice and rail guide assembly.

In another exemplary embodiment of the present invention, a second splice 150 and second rail guide 140 design are shown in FIG. 66A. The shape of rail guide 140 is distinct from the shape of the rail guide 125. The outer shell 142 is generally rectangular shaped with the lower portions of the outer shell 142 tapering inward. It should be understood that the geometrical shape of the splice 150 and rail guide 140 is not limited to the shape described in this embodiment and the rail guide can be any appropriate shape, need not be an enclosed shape, and can include features such as tracks and flanges not shown in these figures. A vertical rib 147 projects upward from the bottom surface of the rail guide 140 and extends along the length of the rail guide 140. Like the rail guide 125, the rail guide 140 includes an outer shell 142 and an oxidation layer or coating on the length of its entire inner surface 145 including the vertical rib 147. The splice 150 includes an inner shell that has an outer surface 152. The inner shell 152 fits within the outer shell 142 and the outer surface 153 of the splice 150 conforms to the inner surface 145 of the rail guide 140. At least some points of the outer surface 153 are in close contact with corresponding points of the inner surface 145 such that the slidable insertion of the splice 150 in the rail 140 creates a snug fit that resists bending of the connection between the rail guides 150 by reducing or eliminating looseness or slop in the interfaces.

Figure 65A:
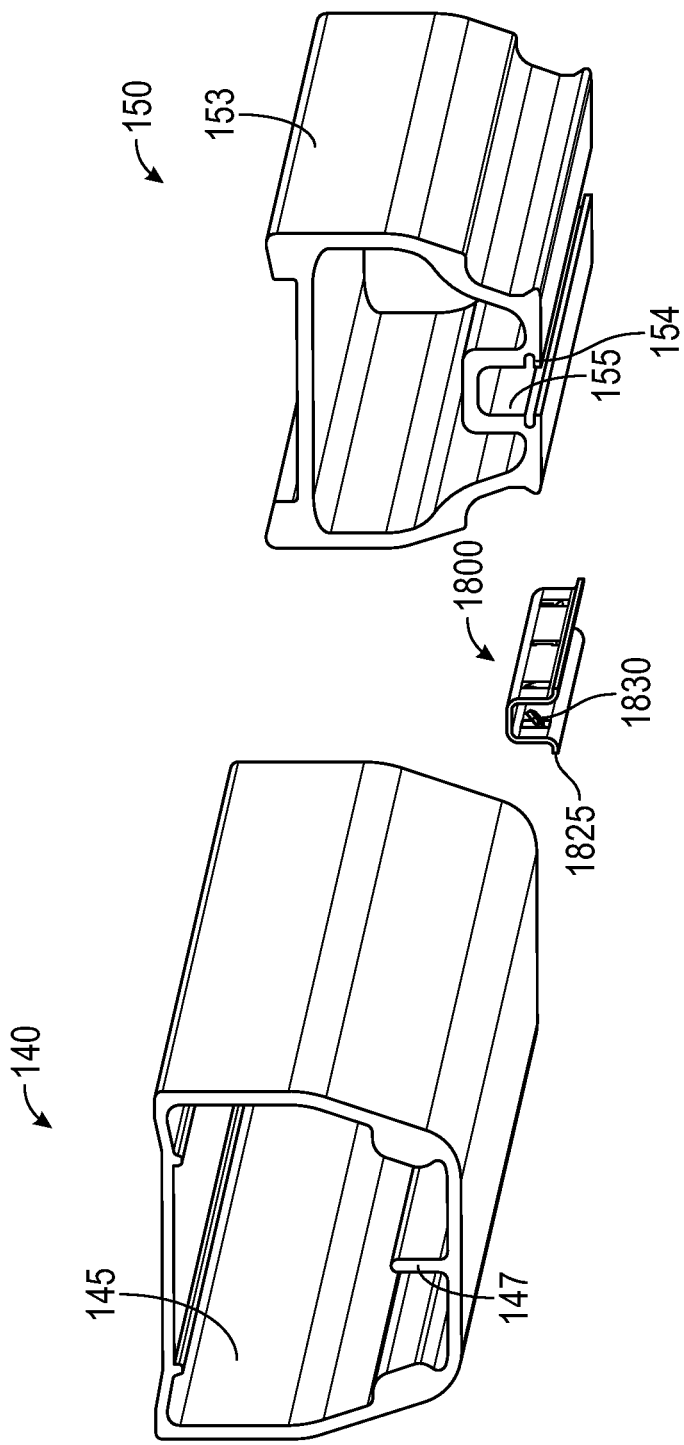
FIG. 65A illustrates an exploded perspective view of the assembly shown in FIGS. 63A and 63B.

The splice 150 includes a lower channel 155 which extends the length of the splice. The contour of the lower channel 155 is configured to at least partially cover the vertical rib 147 when the splice 150 is inserted into the splice 140. The lower channel 155 also includes grooves 154 that are configured to receive flanges 1825 of the electrical bonding element 1800 as shown in FIG. 65. FIG. 65A illustrates an exploded view of the splice 150, the rail guide 140, and the bonding element 1800. FIG. 66B illustrates the splice 150 partially inserted into the rail guide 140.

Figures 65B, 65C:
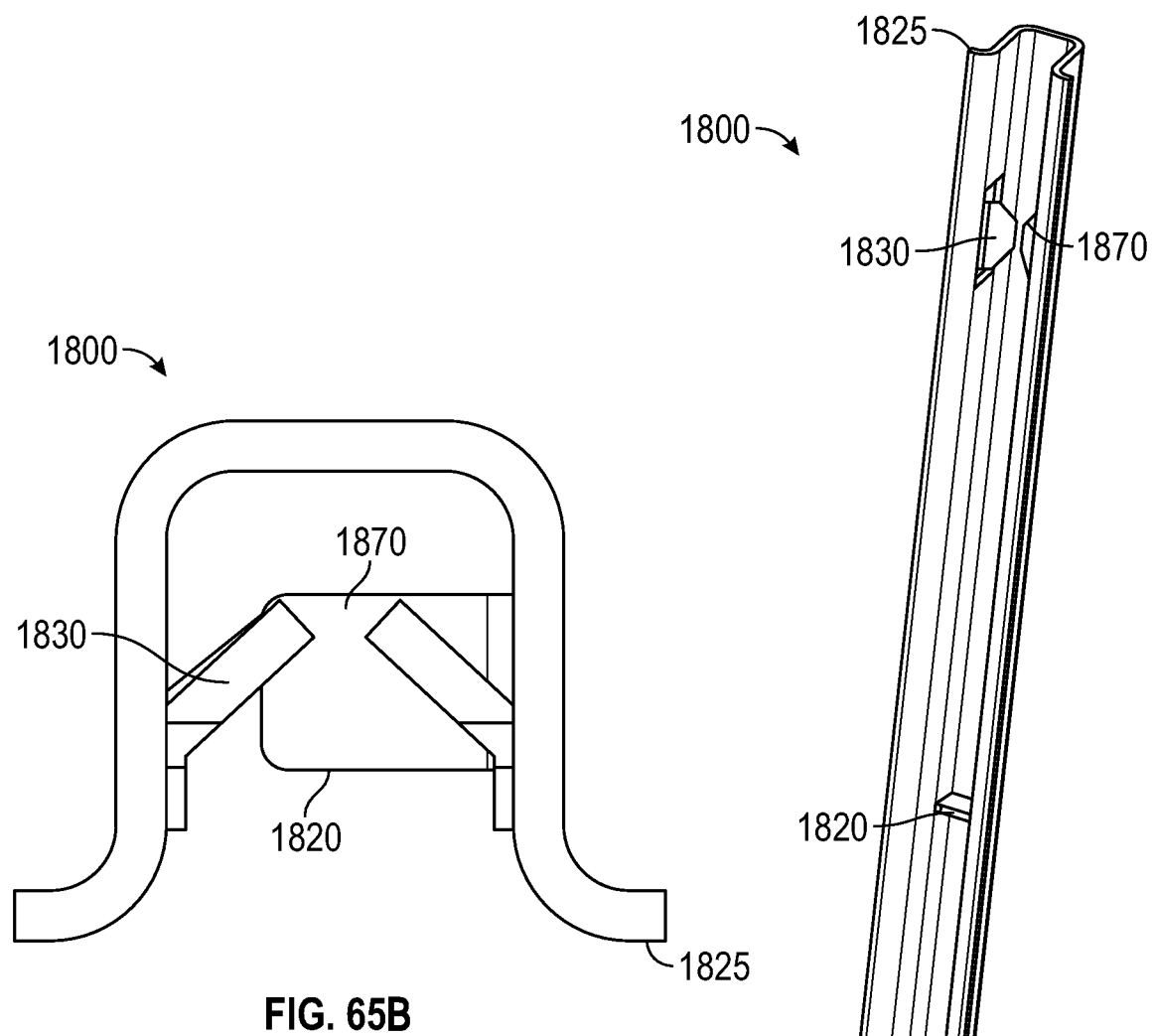
FIG. 65B illustrates an end view of the bonding element of FIG. 65C.
FIG. 65C illustrates a top perspective view of a bonding element for use with the splice and rail guide assembly of FIGS. 66A and 66B.
Figure 66B:
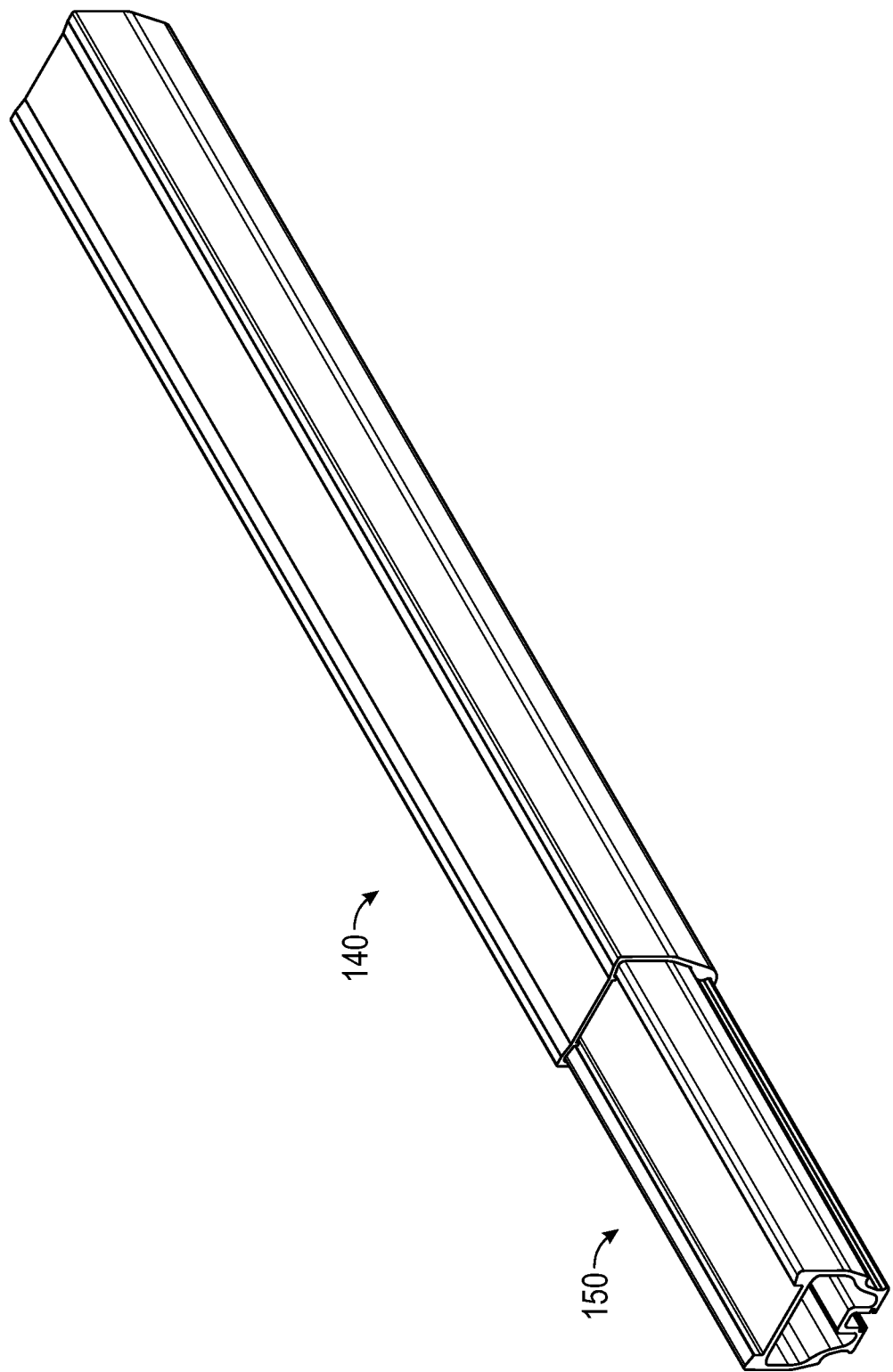
FIG. 66B illustrates a perspective view the splice and rail guide assembly shown in FIG. 66A.

FIGS. 65B and 65C illustrate an electrical bonding element 1800. The bonding element 1800 is configured for insertion into the channel 155 with flanges 1825 slidably extending into the grooves 154 of the lower channel 155. The bonding element 1800 is generally U-shaped with flanges 1825 that extend along the length of the bonding element 1800. A horizontal tab 1820 extends outward from the center of a side of the inner surface of the bonding element 1800. A pair of protrusions 1830 extend outward toward each other from the inner surface of the element 1800 and provide a gap 1870 that is slightly smaller than the width of the vertical rib 147 of the rail guide 140. Each pair of protrusions 1830 are positioned on opposite sides of the bonding element 1800 and can be located anywhere between the horizontal tab 1820 and the ends of the bonding element 1800. Each of the protrusions 1830 have sharp edges configured to penetrate the oxidation layer on the surface 145 of the vertical rib 147 of the rail guide 150. FIG. 65B illustrates an end view of the bonding element 1800.

Figure 64:
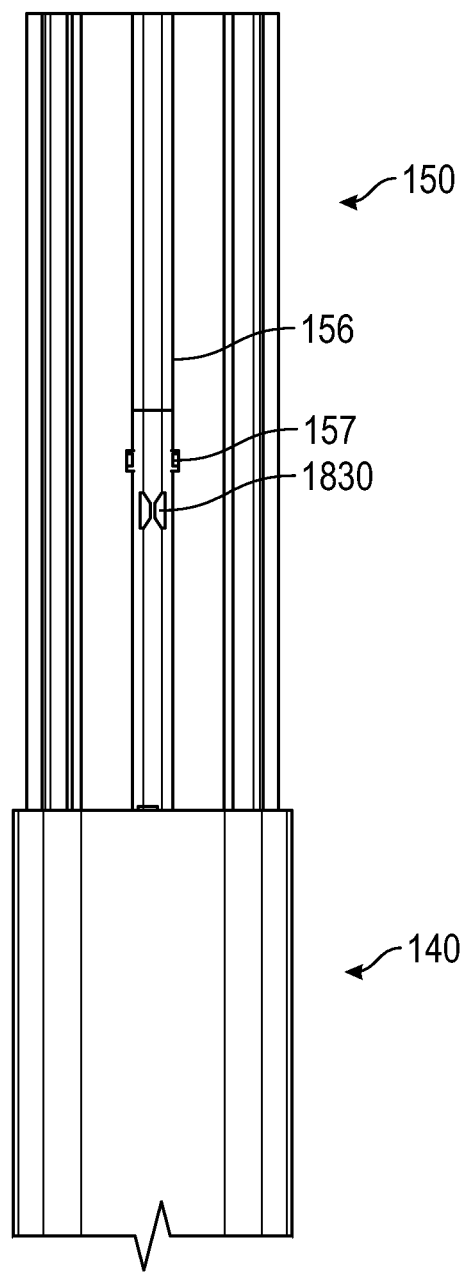
FIG. 64 illustrates a bottom view of a partially inserted splice into the rail guide of the assembly shown FIGS. 63A and 63B.

As shown in FIG. 64 shows a bottom view of the partially assembled splice 150, rail guide 150, and bonding element 1800 whereby the splice 140 has been inserted into the rail guide 150 with the bonding element 1800 positioned in the approximate center of the lower channel 155 of the splice 150, the shape of the bonding element 1800 is configured to fit within the channel 155 of the splice 150 so that the flanges 1825 fit within the grooves 154 of the splice 150. The grooves 154 of the channel 155 include a lip 156 that can be pressed onto the flanges 1825 forming deformed portions 157 securing the bonding element 1800 to the splice 150. The splice 140 is secured by the deformed portions 157 of the bent lips 156.

Figure 63A:
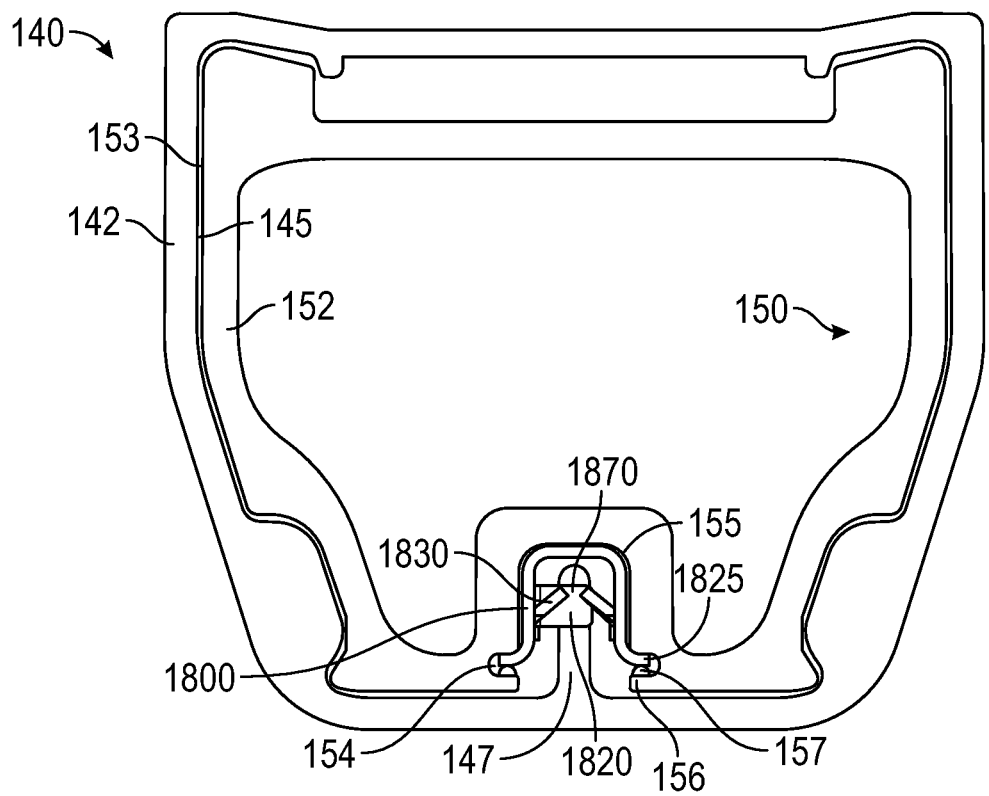
FIG. 63A illustrates an end view of an alternate exemplary embodiment of a splice, rail guide, and bonding element assembly.
Figure 63B:
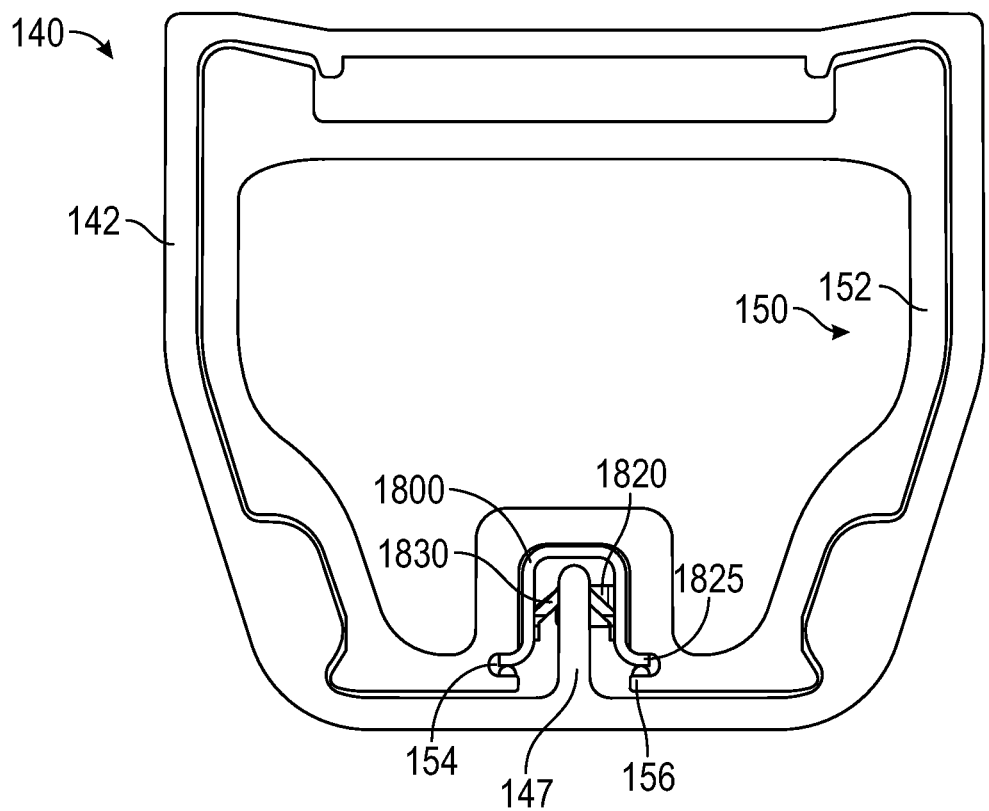
FIG. 63B illustrates an end view of the embodiment shown in FIG. 63A from the opposite end of the assembly.

FIG. 63A illustrates an end view of the splice 150, rail guide 140, and the bonding element 1800 assembly. From this view, the bonding element 1800 is positioned within the lower channel 155 in the approximate center of the splice 150. The splice 150 has been inserted into one end of the rail guide 140 to a location where the vertical rib 147 of the rail guide 140 has contacted the horizontal tab 1820 thereby preventing the splice 150 from moving any further along the inside of the rail guide 140. The bent lips 156 are pressed onto the flanges 1825 to provide resistance and a stopping point for the bonding element 1800 within the lower channel 155 of the splice 150. FIG. 63B illustrates an end view from the opposite side of the assembly. From this view, the splice 150 has been inserted into the rail guide 140 whereby the horizontal tab 1820 has contacted the vertical rib 147. The insertion of the vertical rib 147 of the rail guide 140 into the gap 1870 produces an interference fit so that the sharp ends of the pair of protrusions 1830 penetrate the oxidation layer of the vertical rib 147 and create an electrical bond between the splice 150 and the rail guide 140.

What is claimed is:

1. An apparatus for joining and electrically bonding a pair of solar panel rail guides comprising:
   A. a spring, the spring comprising:
      i. a first resilient band, the first resilient band comprising:
         a. a first end wherein the width of the first end is greater than the width of the longitudinal portion of the first resilient band;
         b. a second end; and
         c. a sharp element extending upward from the first resilient band;
      ii. a second resilient band;
         a. a first end wherein the width of the first end is greater than the width of the longitudinal portion of the second resilient band;
         b. a second end; and
         c. a sharp element extending upward from the second resilient band
      ii. a central portion coupled to the second ends of the first and second resilient bands comprising:
         a. a vertical tab extending upward from the central portion; and
         b. a first and a second edge wherein the width between the first and second edges is greater than the width of the longitudinal portions of the first and second resilient bands;
   wherein the spring is internal to the pair of solar panel rail guides.

2. The apparatus of claim 1, wherein the first edge comprises a notch.

3. The apparatus of claim 2, wherein the second edge comprises a notch.

4. The apparatus of claim 1, wherein the first and second resilient bands extend upward forming a plateau portion on each of the first and second resilient bands.

5. The apparatus of claim 4, wherein the sharp elements of the first and second resilient bands are located on the plateau portions of each of the first and second resilient bands.

6. The apparatus of claim 1, wherein the first resilient band further comprises a position indicator located between the sharp edge of the first resilient band and the central portion.

7. An assembly for joining and electrically bonding a pair of solar panel rail guides comprising:
   A. a splice, the splice comprising a shell, the shell comprising:
      i. an outer surface and an inner surface; and
      ii. a pair of opposing lips forming a channel along the length of the shell, each of the opposing lips forming a groove along the length of the opposing lips;
   B. a spring, the spring comprising:
      i. a first resilient band, the first resilient band comprising:
         a. a first end wherein the width of the first end is greater than the width of the longitudinal portion of the first resilient band wherein the end is configured to fit within the grooves of the opposing lips;
         b. a second end; and
         c. a sharp element extending upward from the first resilient band;
      ii. a second resilient band;
         a. a first end wherein the width of the first end is treater than the width of the longitudinal portion of the second resilient band wherein the end is configured to fit within the grooves of the opposing lips;
         b. a second end; and
         c. a sharp element extending upward from the second resilient band
      iii. a central portion coupled to the second ends of the first and second resilient bands comprising:
         a. a vertical tab extending upward from the central portion; and
         b. a first and a second edge wherein the width between the first and second edges is greater than the width of the longitudinal portions of the first and second resilient bands wherein the first and second edges are configured to fit within the grooves of the opposing lips;
   wherein each of the lips further comprise a deformable portion.

8. The assembly of claim 7, wherein the first edge and the second edge each comprise a notch.

9. The assembly of claim 7, wherein the deformable portions are configured to press downward onto the first or second edges to secure the spring within the channel.

10. The assembly of claim 7, wherein the first and second resilient bands extend upward forming a plateau portion on each of the first and second resilient bands.

11. The assembly of claim 10, wherein the sharp elements of the first and second resilient bands are located on the plateau portions of each of the first and second resilient bands.

12. The assembly of claim 7, wherein the first resilient band further comprises a position indicator located between the sharp edge of the first resilient band and the central portion.

13. An assembly for joining and electrically bonding a pair of solar panel rail guides comprising:
   A. a splice, the splice comprising a shell, the shell comprising:
      i. an outer surface and an inner surface; and
      ii. a pair of opposing lips forming a channel along the length of the shell, each of the opposing lips forming a groove along the length of the opposing lips;
   wherein the splice is internal to the pair of solar panel rail guides.

* * * * *